Figure 2:
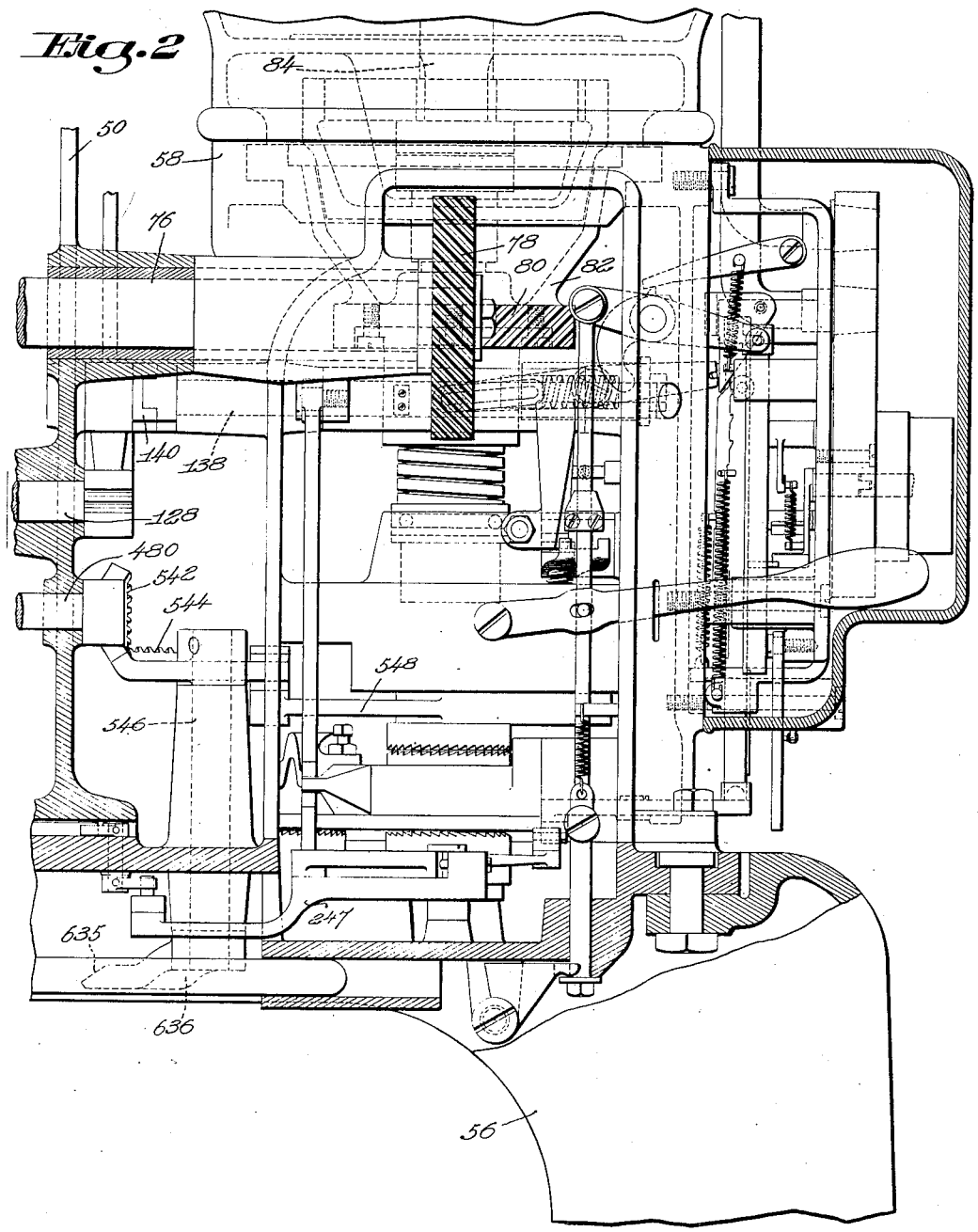

April 25, 1939.　　　A. R. MORRILL　　　2,155,438

SHOE MACHINE

Filed Feb. 9, 1933　　　28 Sheets-Sheet 1

Fig.1

Witness
Frederick S. Greenleaf.

Inventor
Alfred R. Morrill
by Fish Hildreth
Cary & Jenney Attys

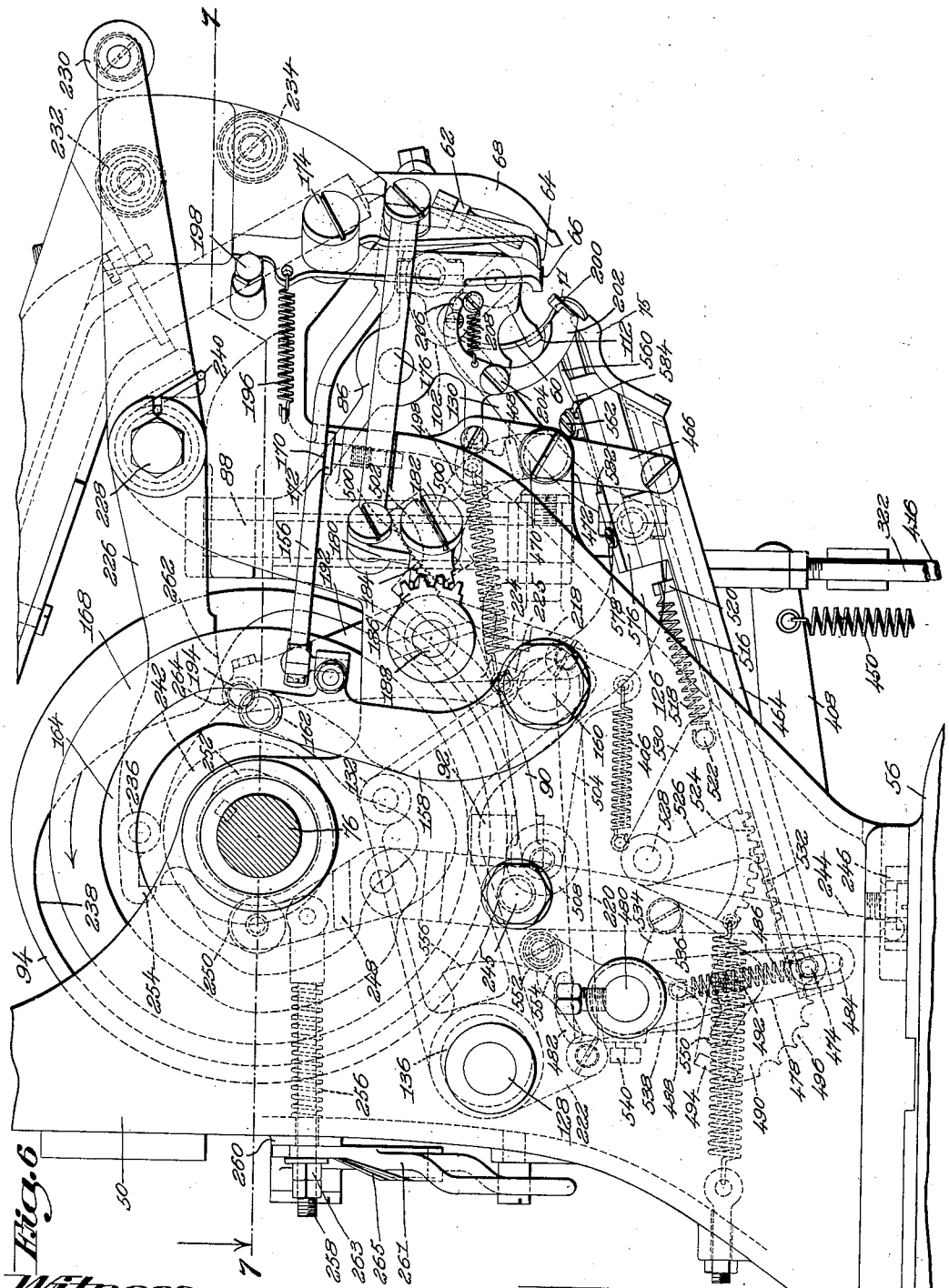

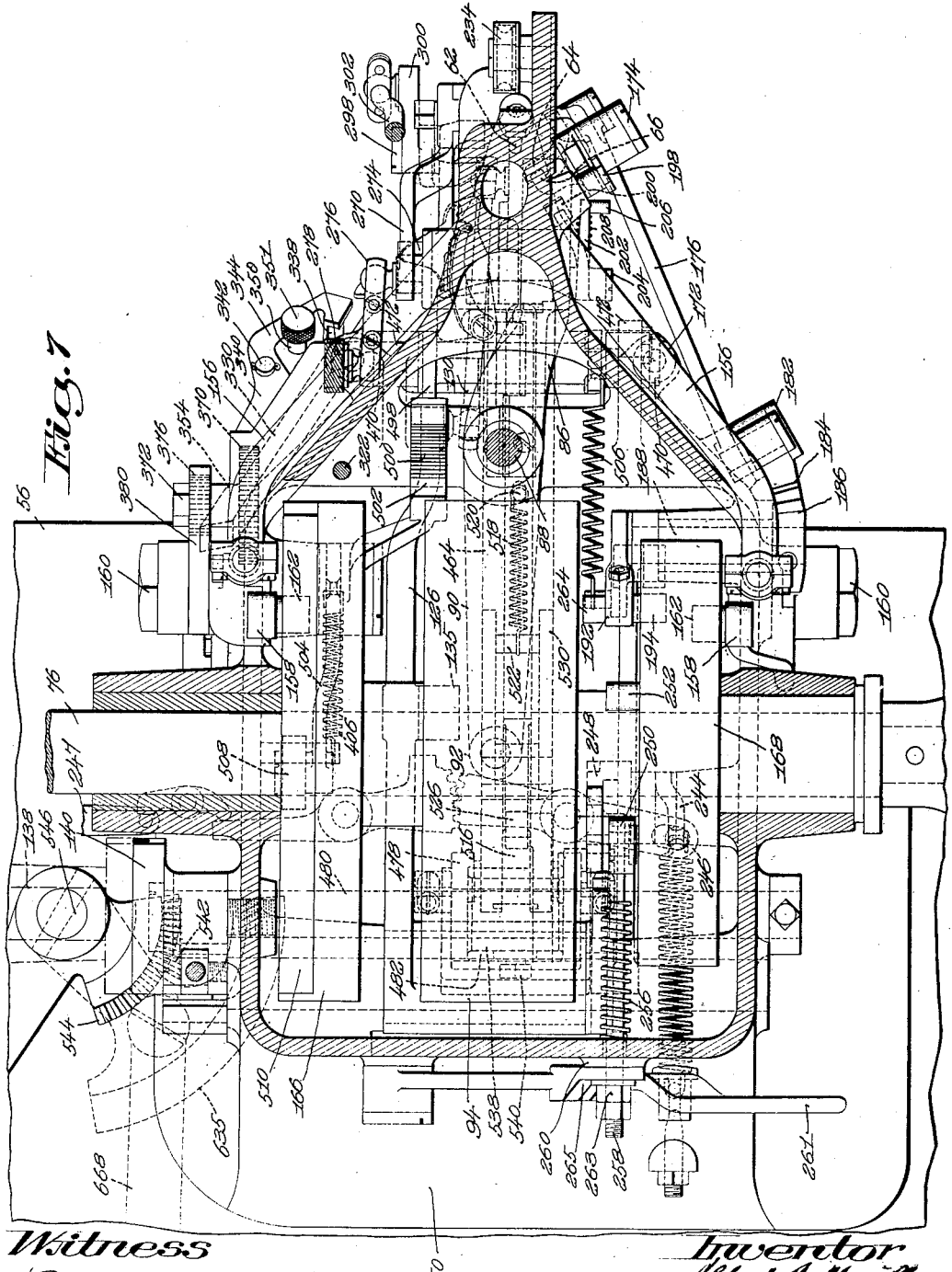

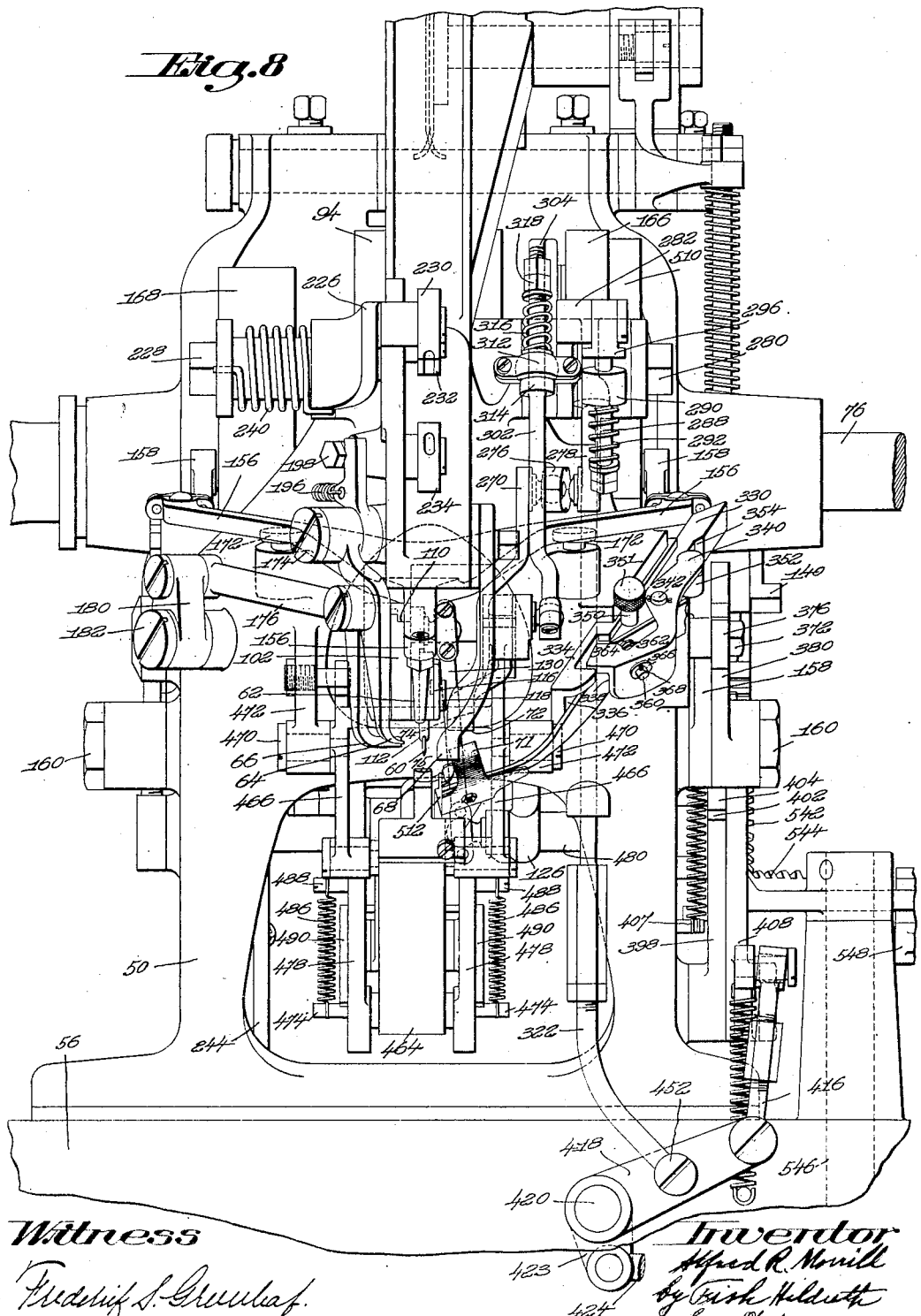

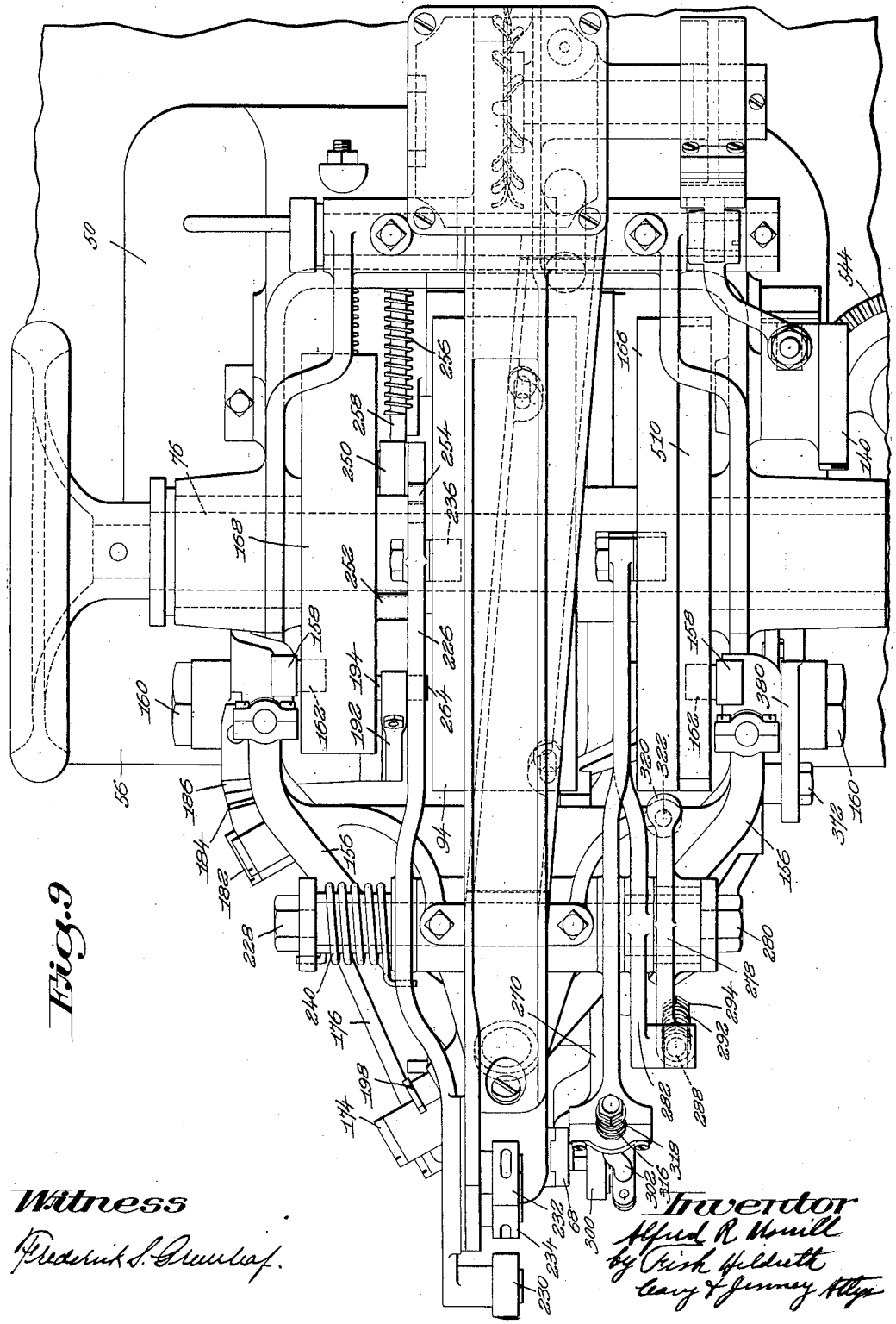

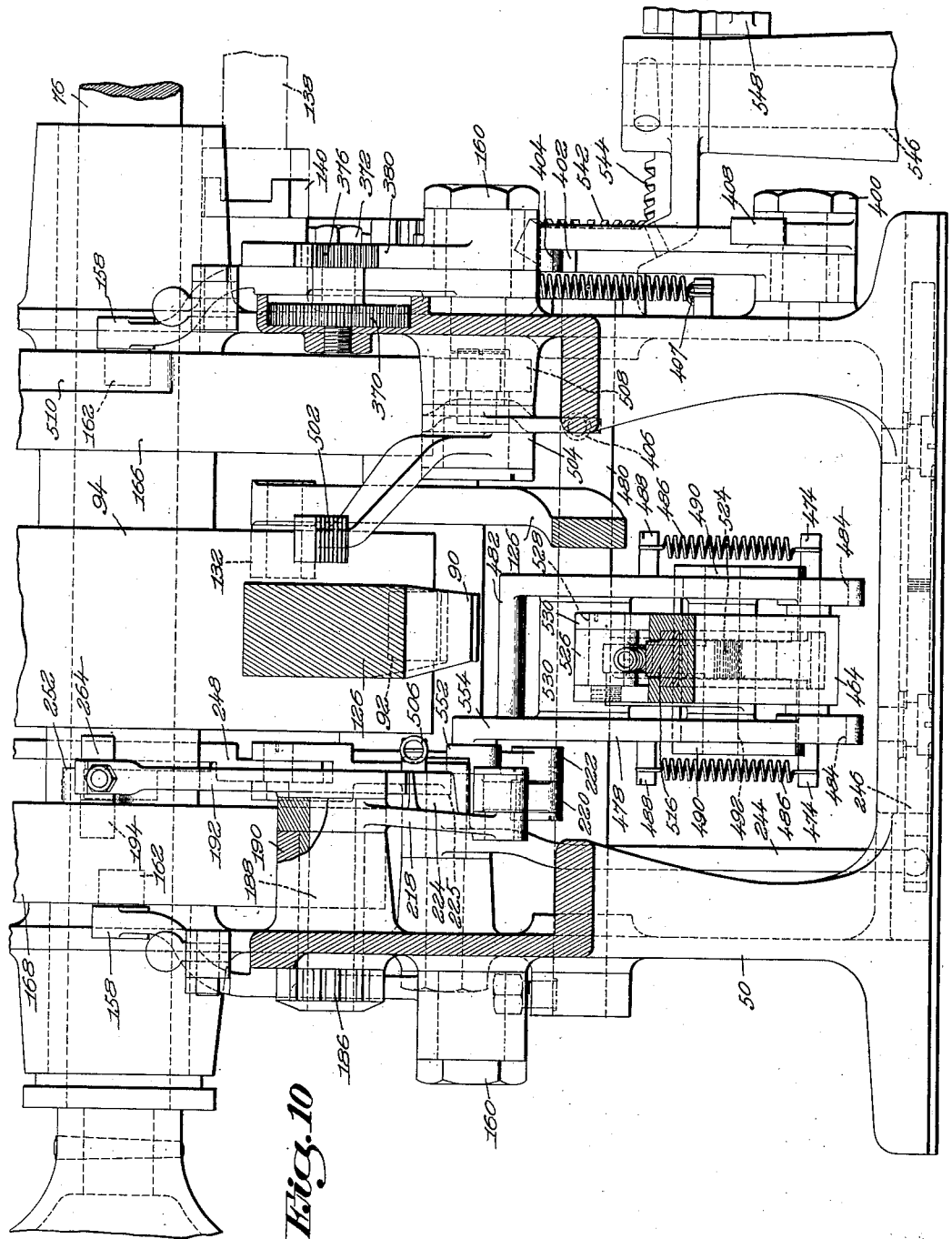

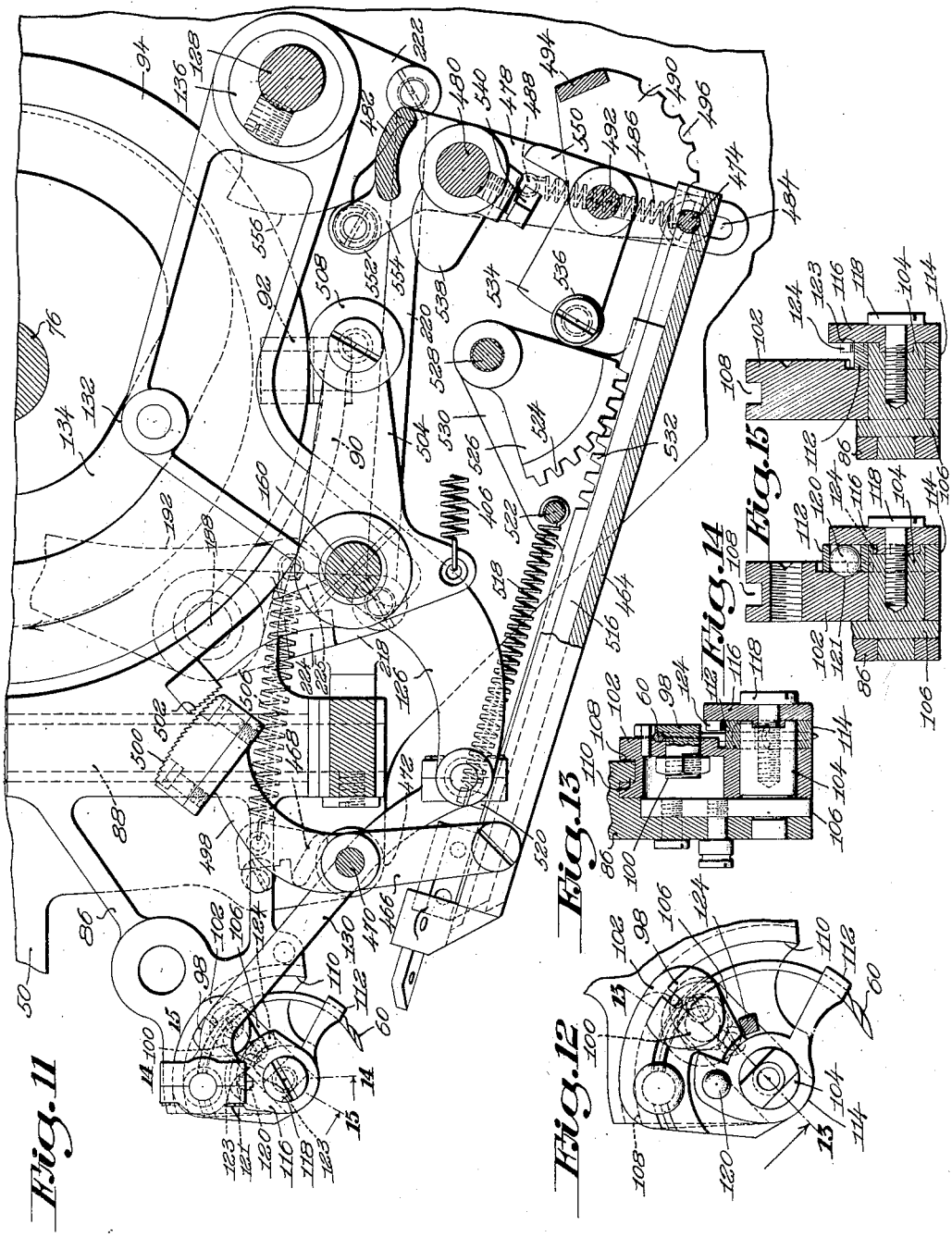

April 25, 1939.  A. R. MORRILL  2,155,438
SHOE MACHINE
Filed Feb. 9, 1933  28 Sheets—Sheet 12
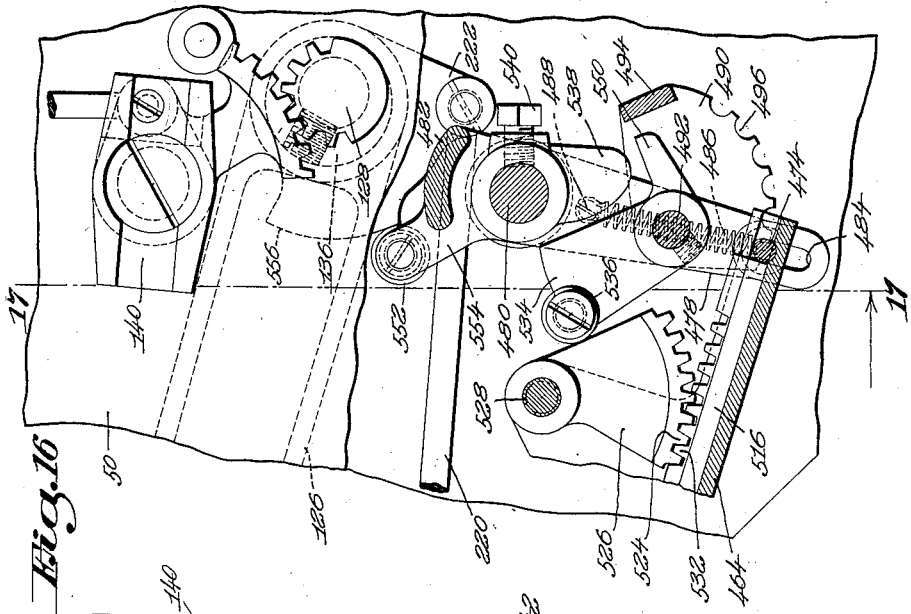

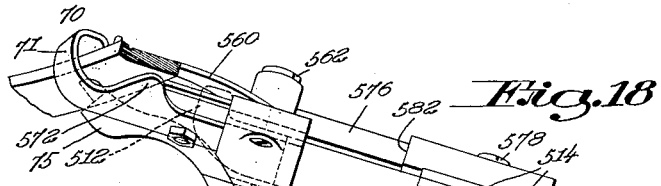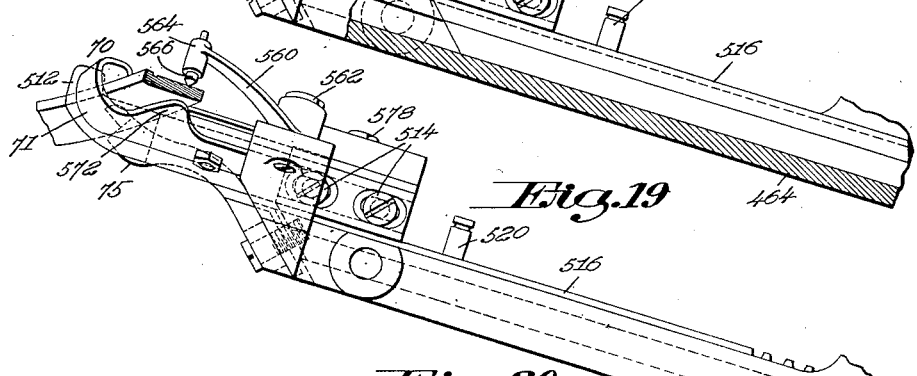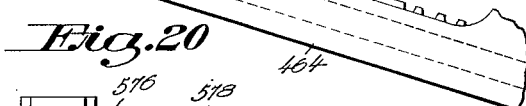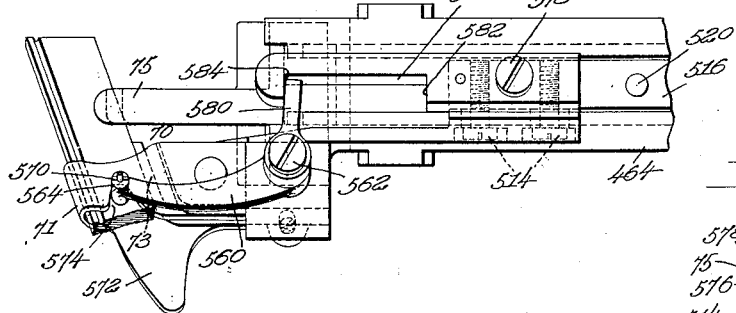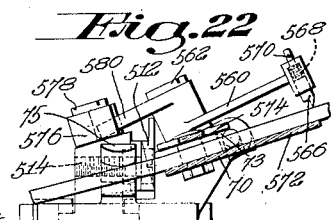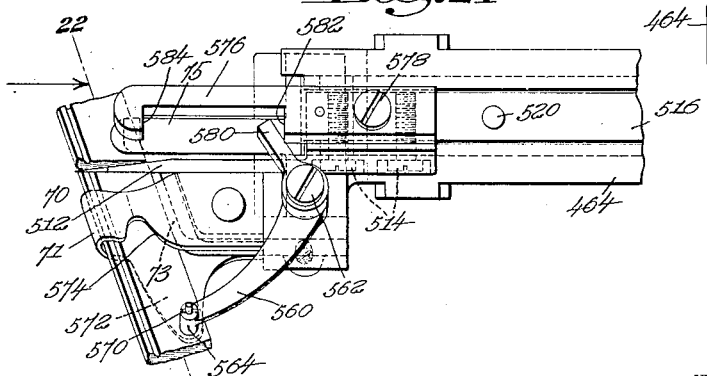

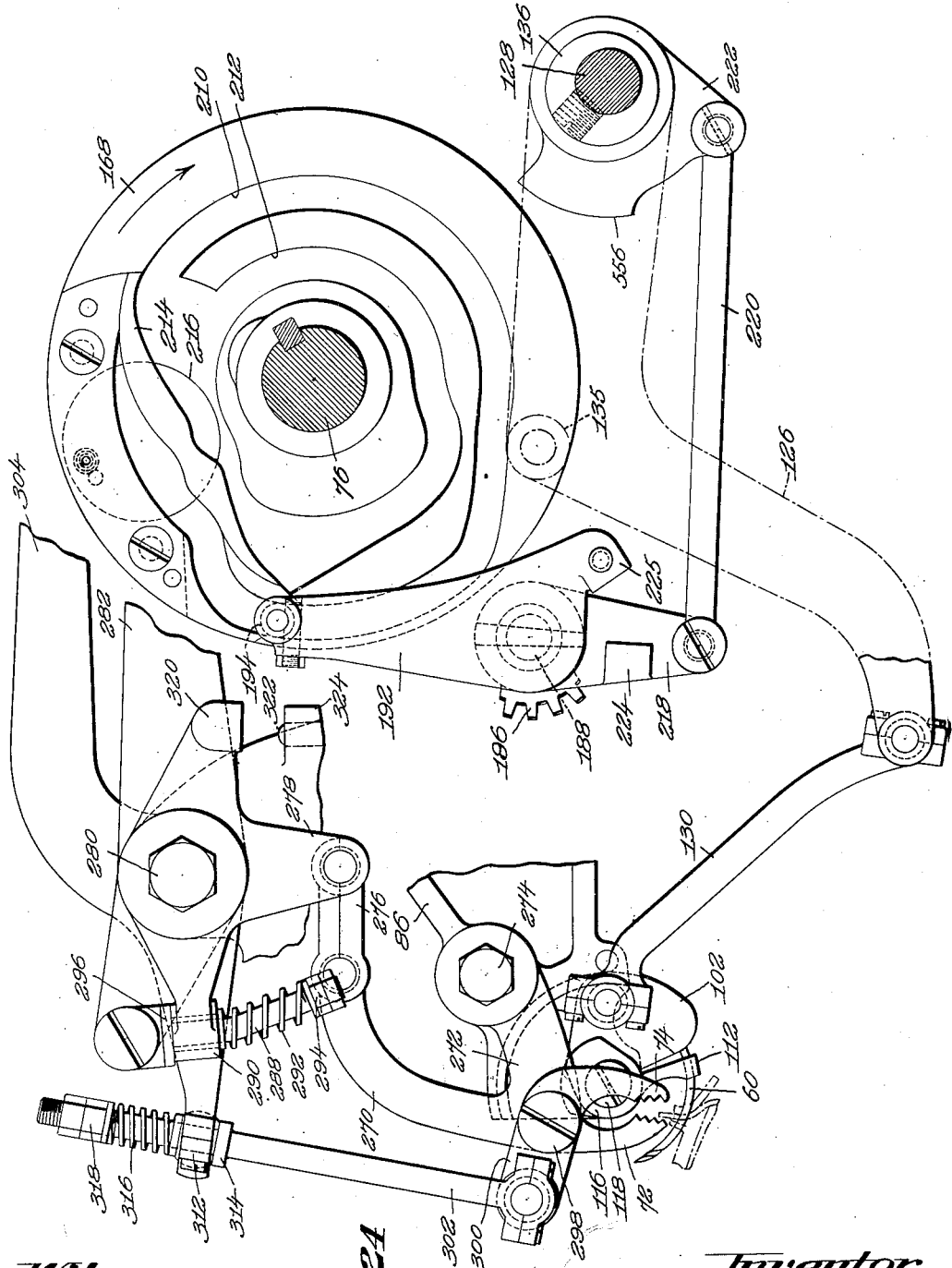

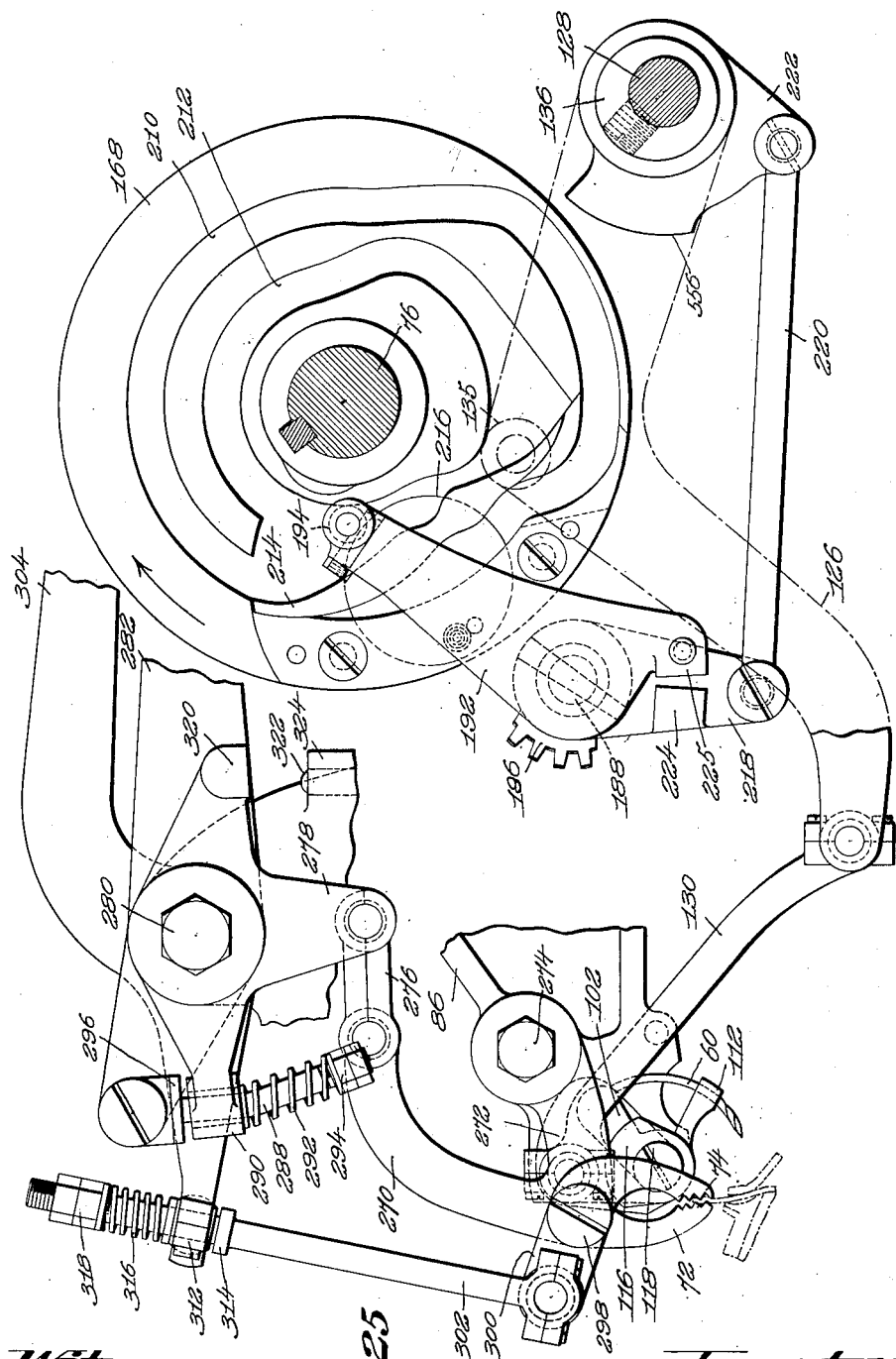

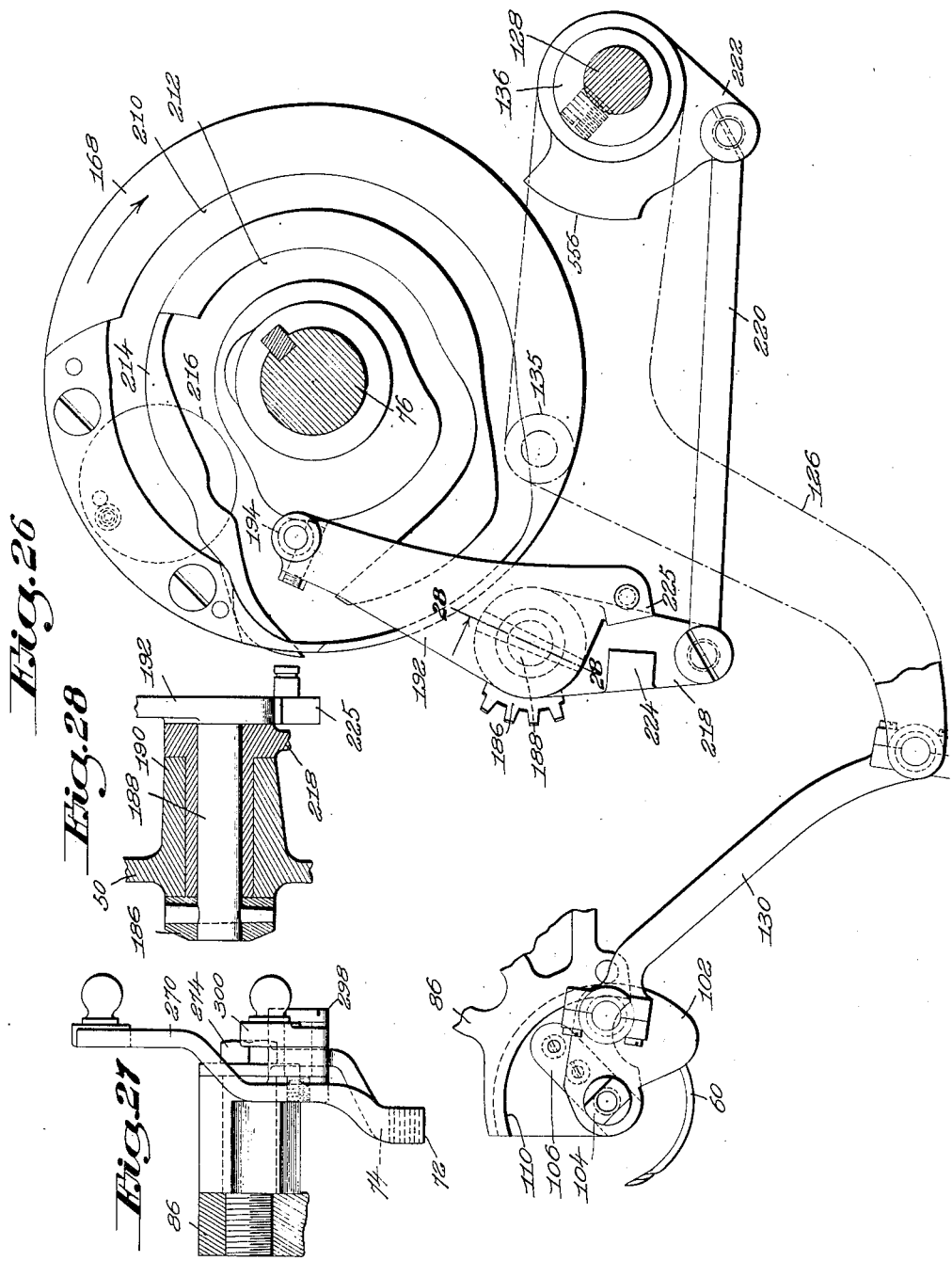

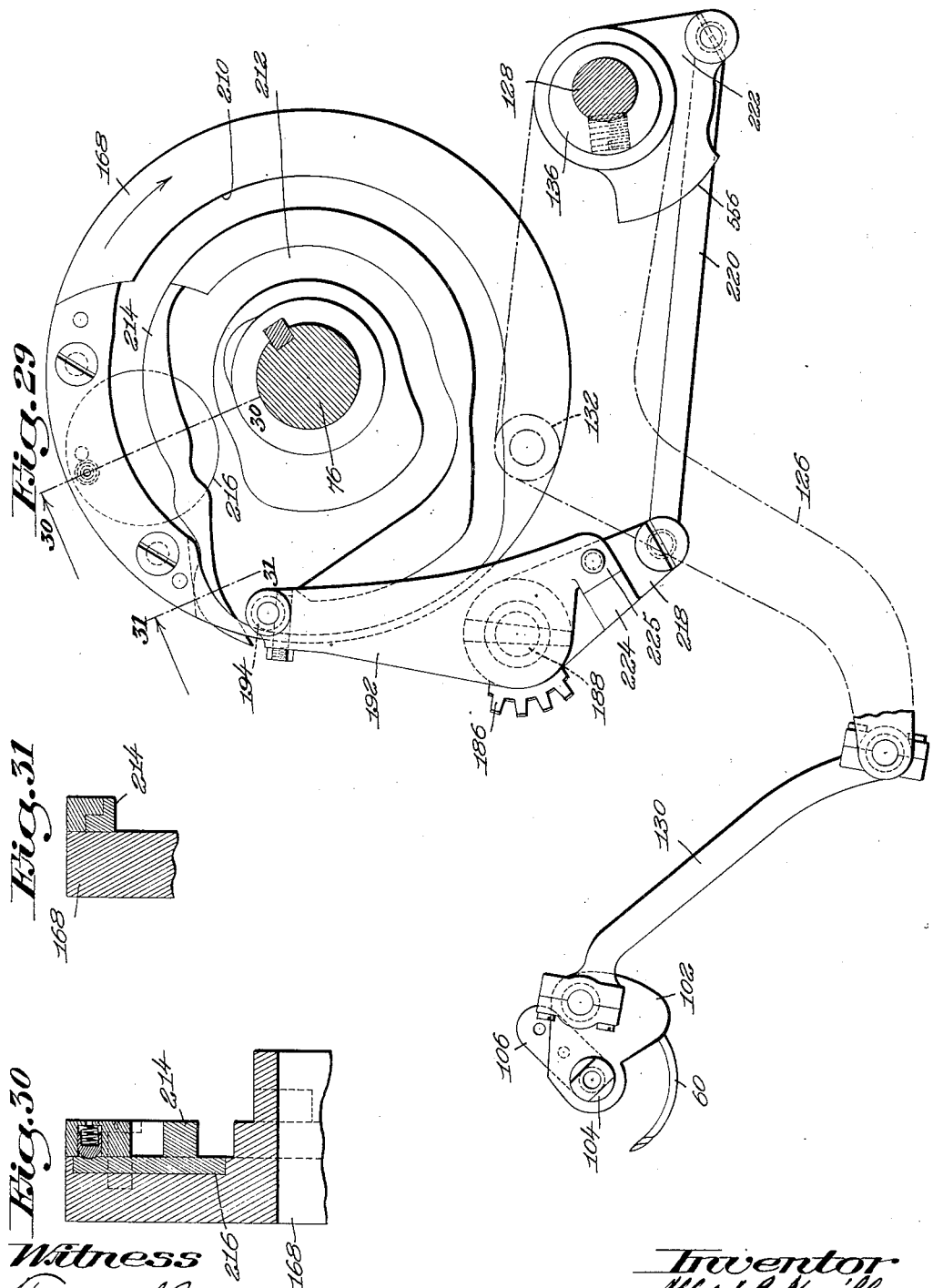

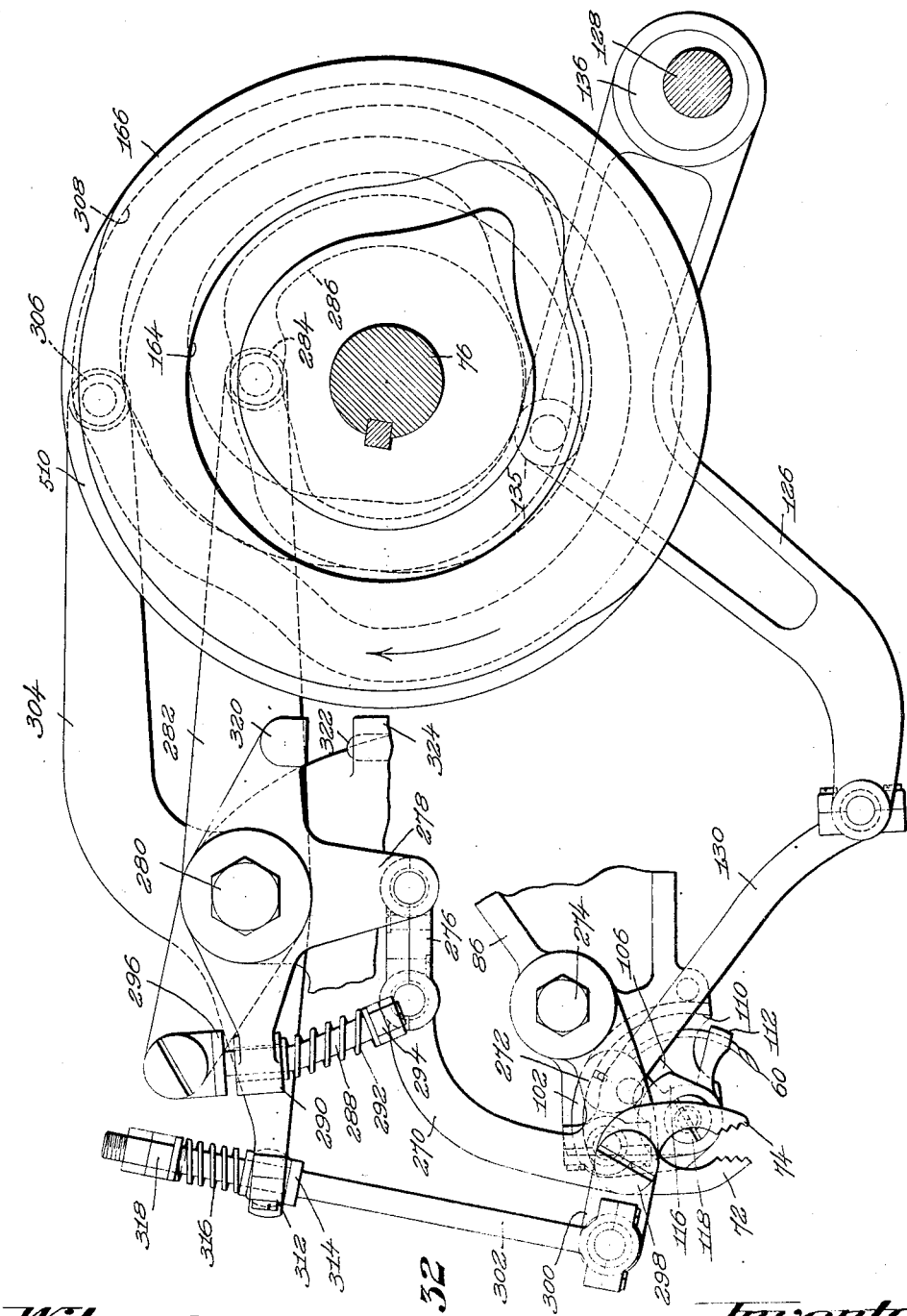

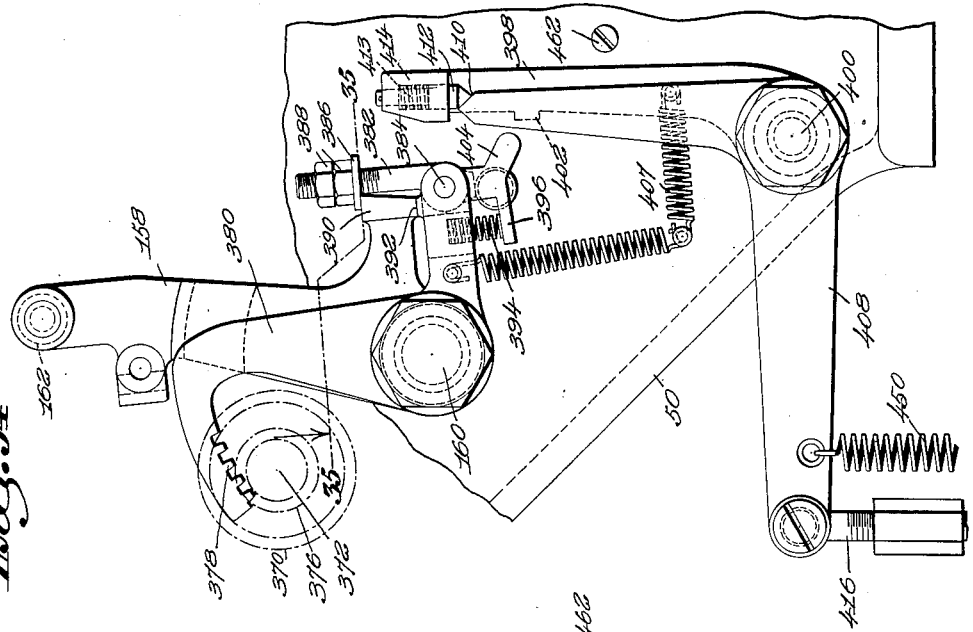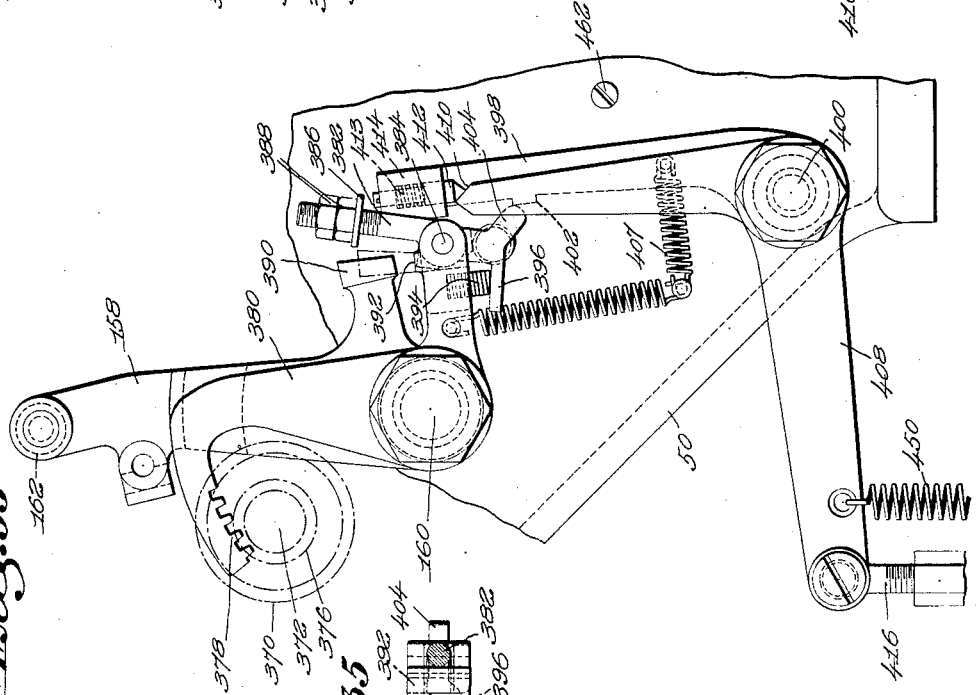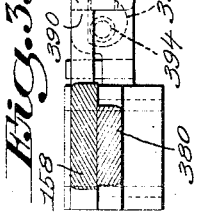

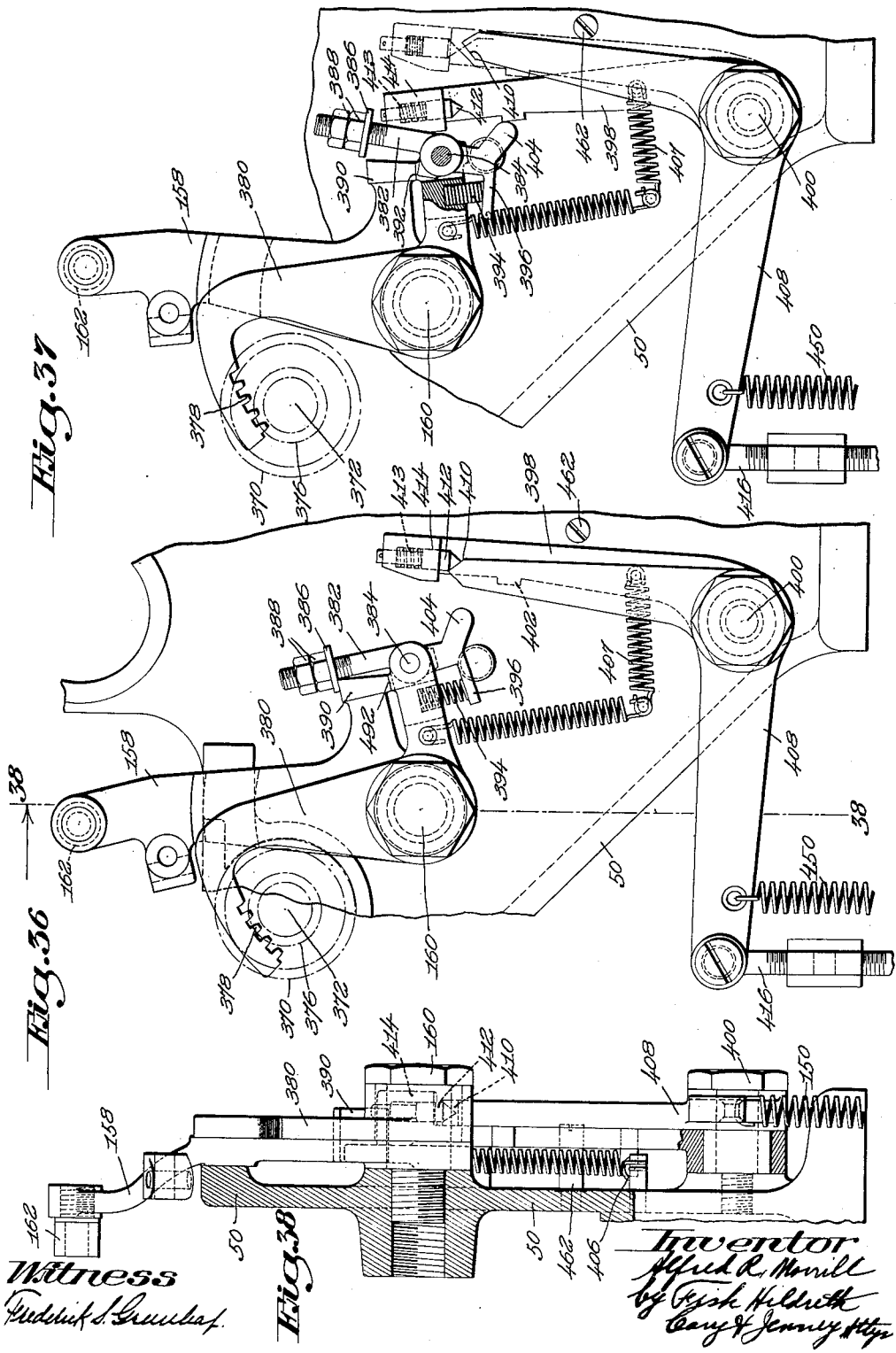

April 25, 1939.　　　A. R. MORRILL　　　2,155,438
SHOE MACHINE
Filed Feb. 9, 1933　　28 Sheets-Sheet 22
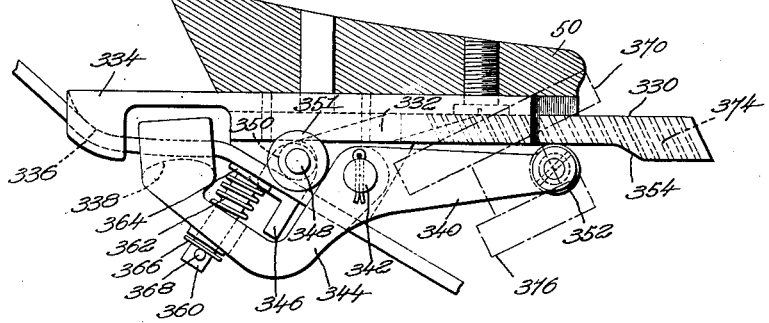
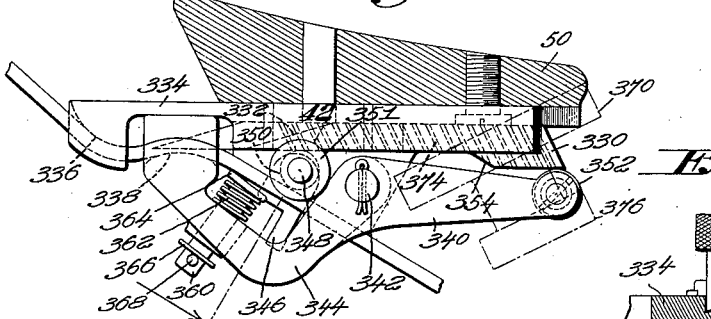
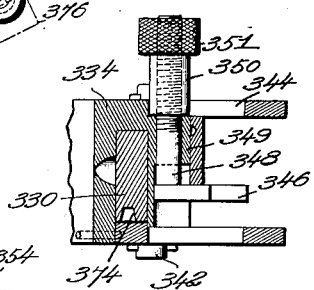
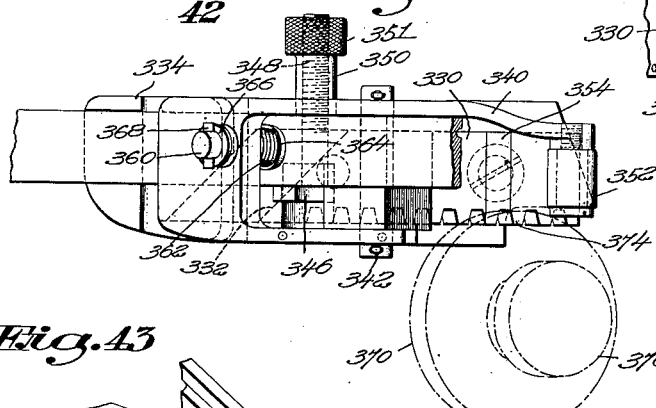
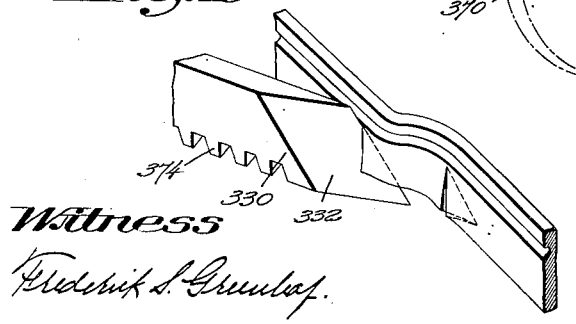

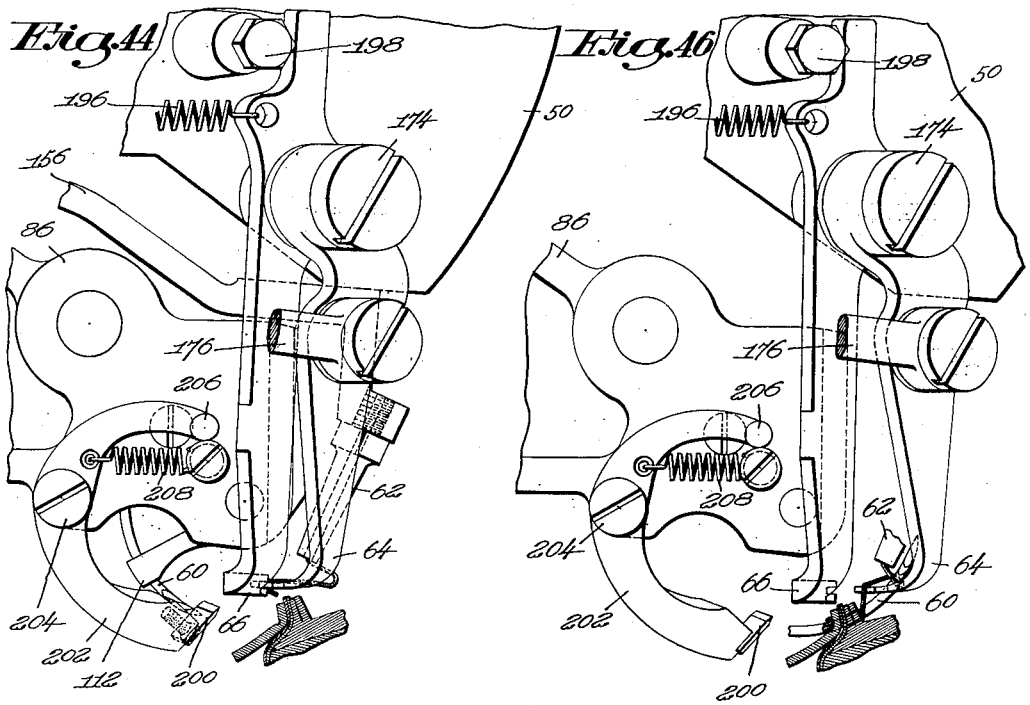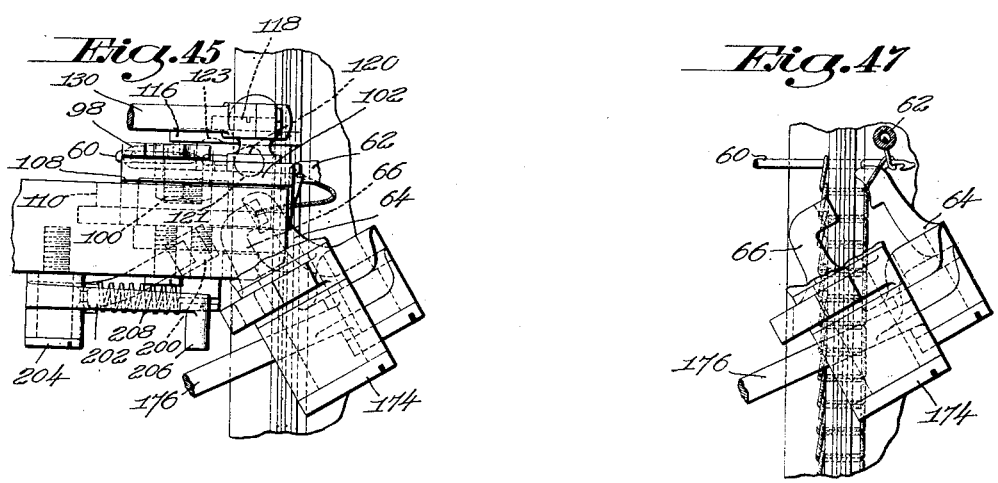

April 25, 1939. A. R. MORRILL 2,155,438
SHOE MACHINE
Filed Feb. 9, 1933 28 Sheets-Sheet 24
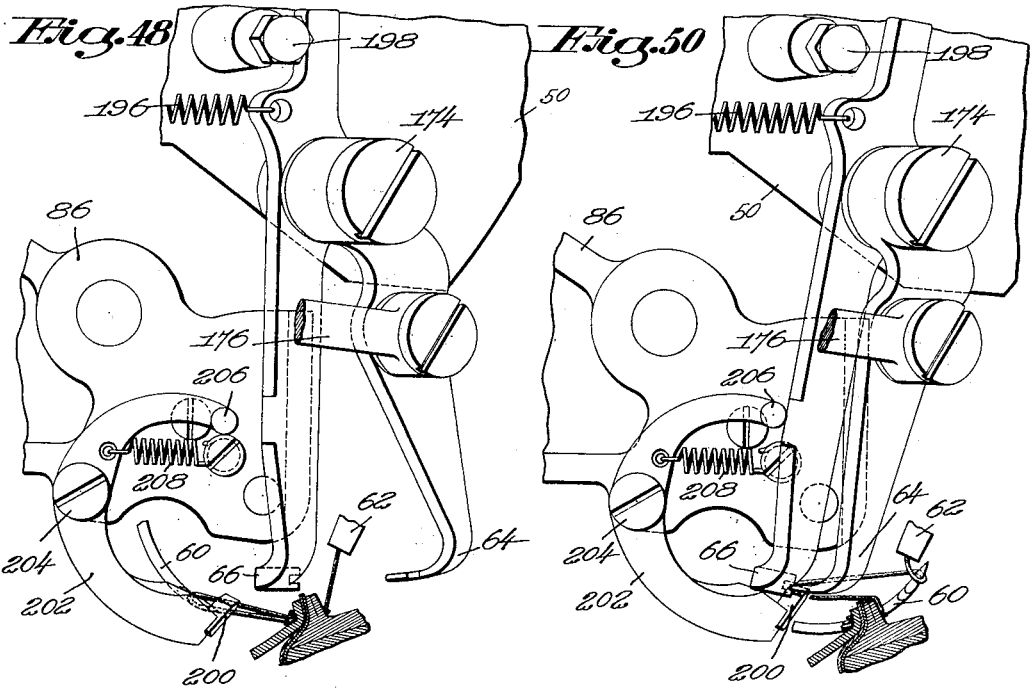
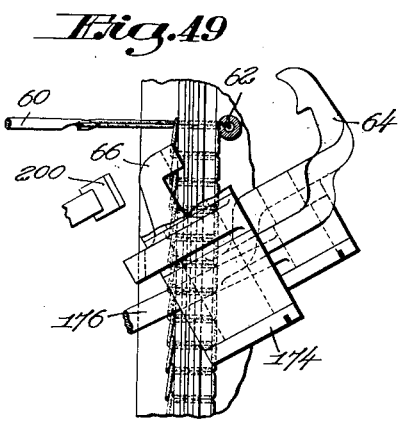
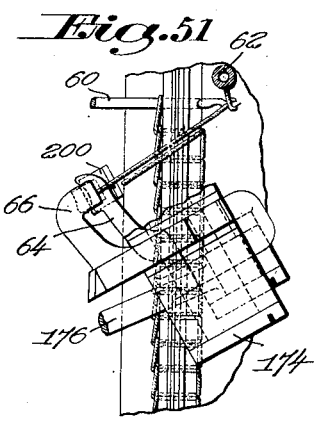

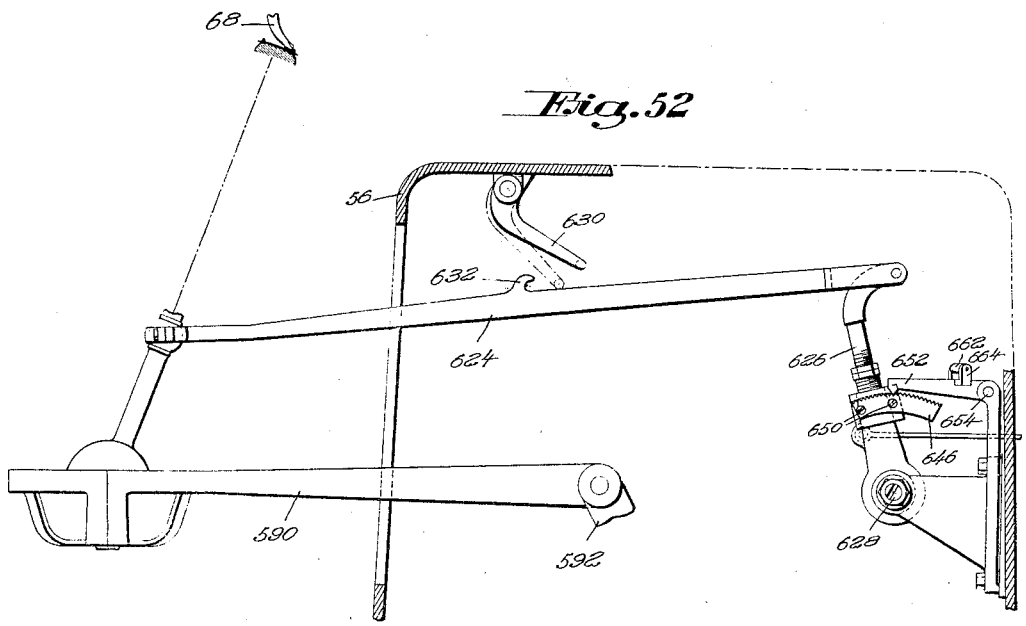
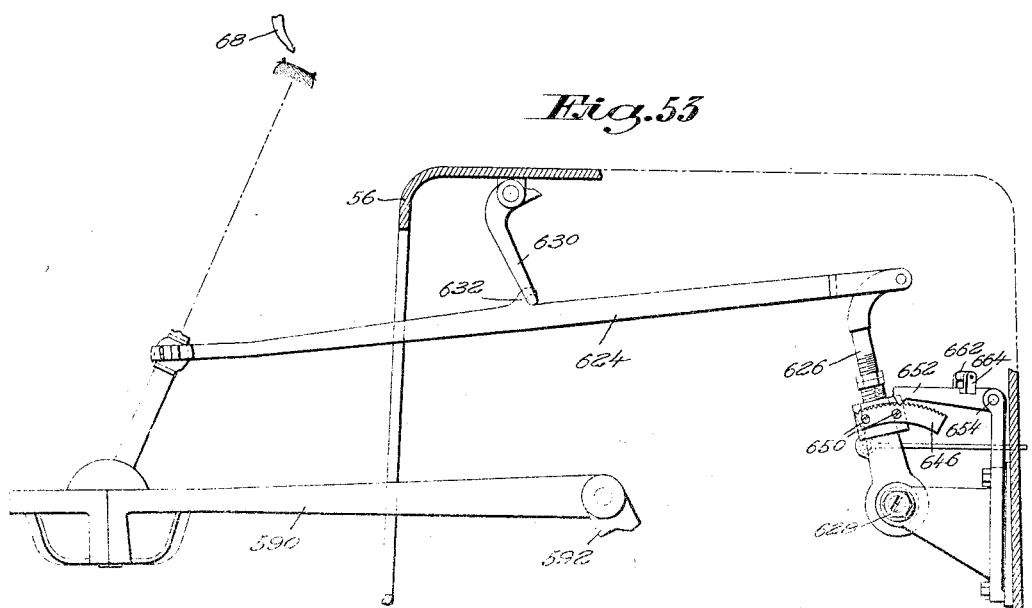

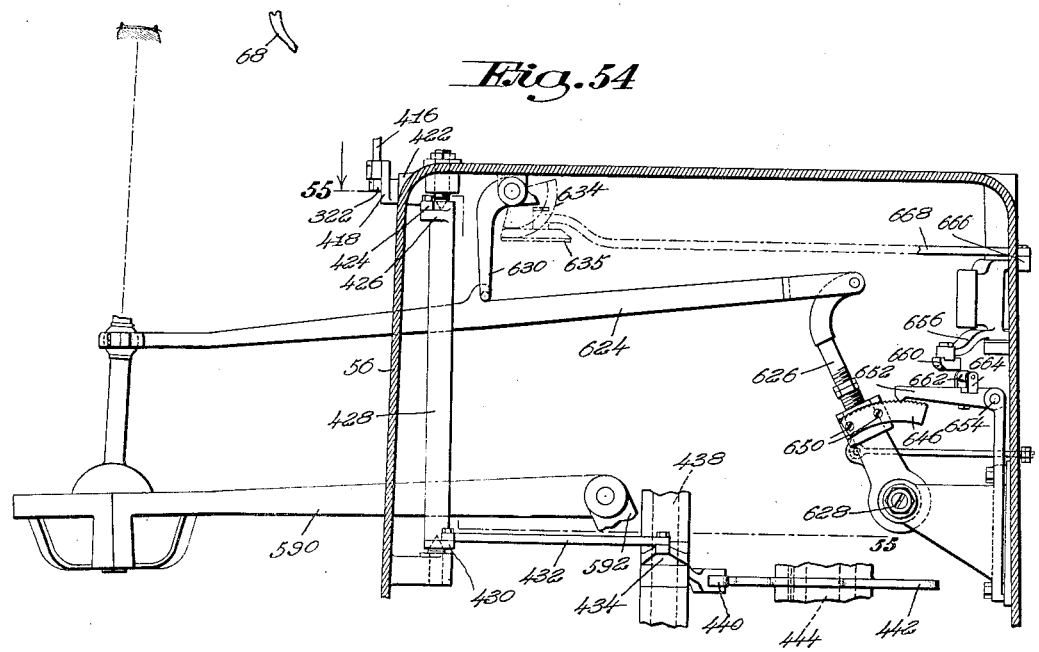
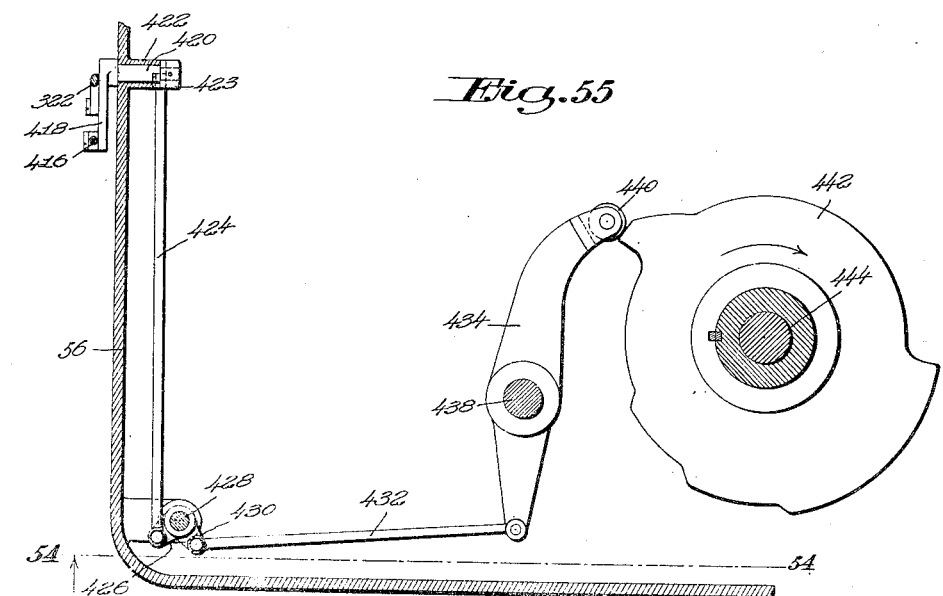

April 25, 1939.   A. R. MORRILL   2,155,438
SHOE MACHINE
Filed Feb. 9, 1933   28 Sheets-Sheet 27
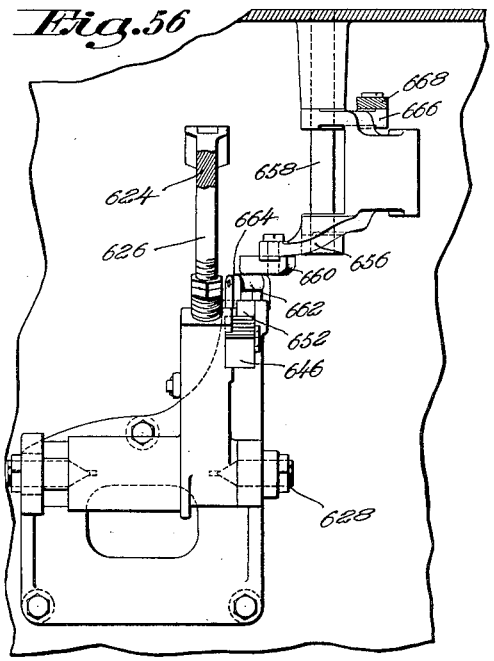
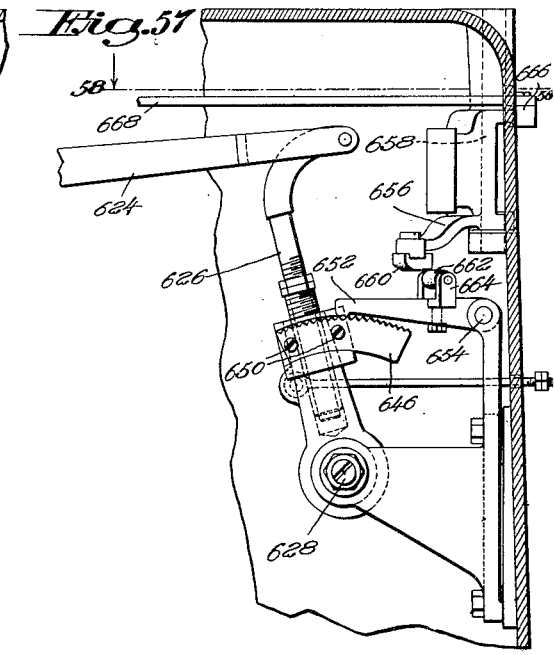
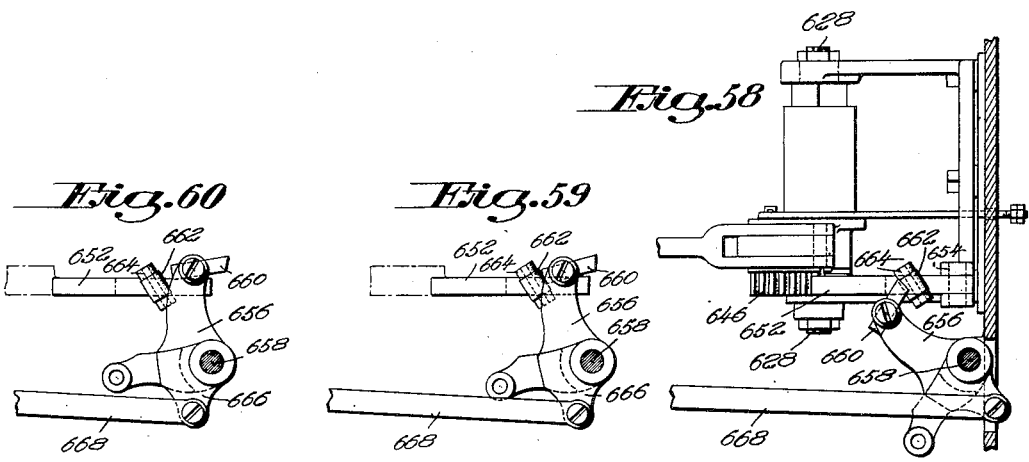
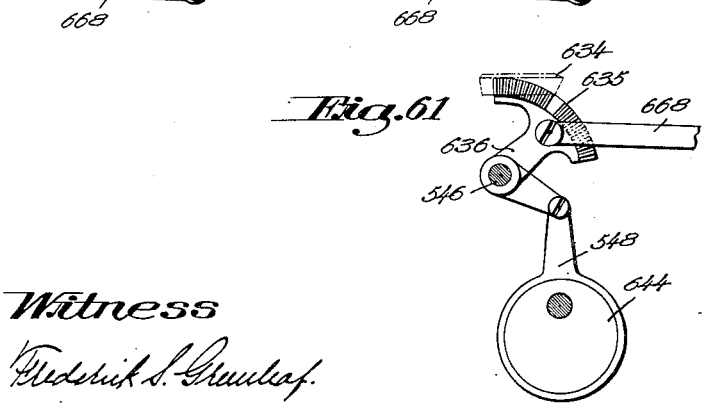
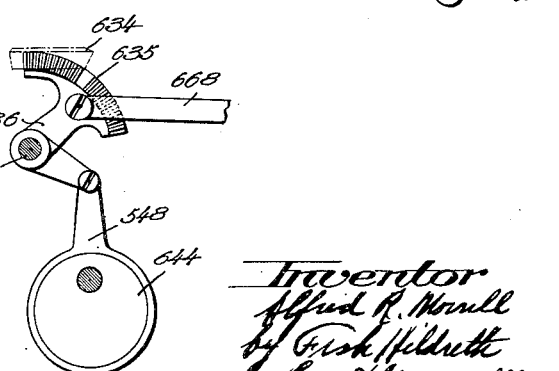

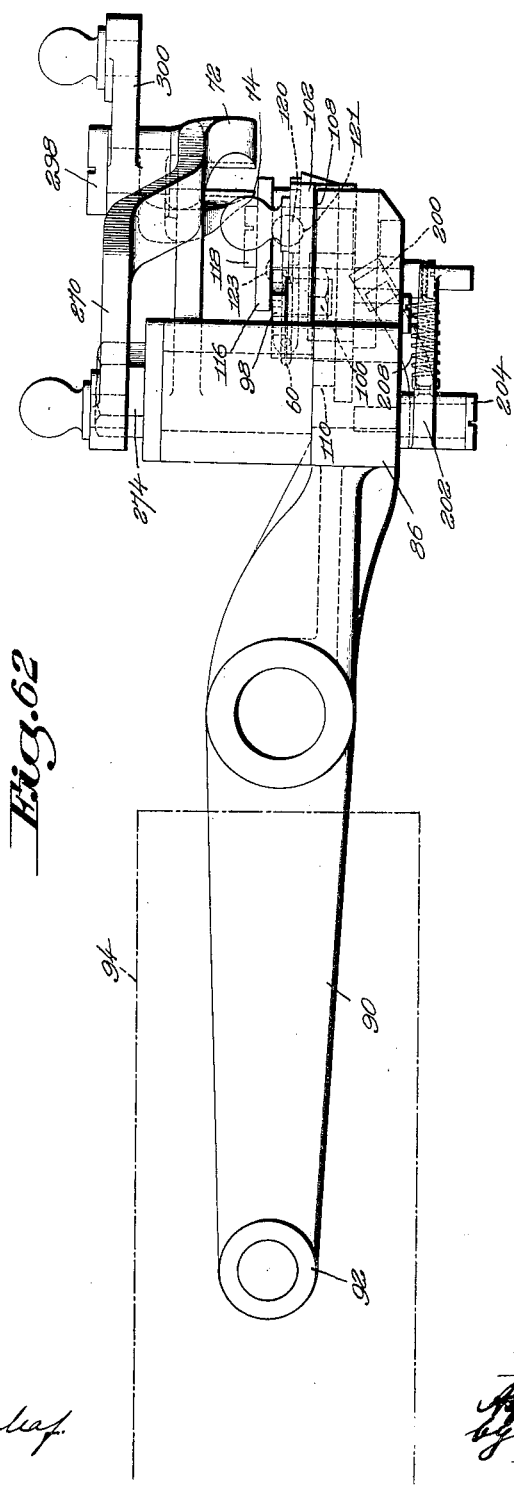

Patented Apr. 25, 1939

2,155,438

UNITED STATES PATENT OFFICE 2,155,438

SHOE MACHINE

Alfred R. Morrill, Beverly, Mass., assignor to United Shoe Machinery Corporation, Paterson, N. J., a corporation of New Jersey Application February 9, 1933, Serial No. 655,934

27 Claims. (Cl. 112—46)

The present invention relates to shoe machines, and is herein shown as embodied in a machine for operating on shoes of the type in which the shoe is supported on a jack and in which the jack and the means for operating on the shoe are moved relatively to transfer the point of operation about the shoe, and to change the relative positions of the shoe and the operating means to cause the shoe to be presented properly to the operating means as the point of operation is transferred about the shoe, all of the relative movements of the shoe and the operating means being produced and controlled by automatically acting mechanisms. While the several features of the present invention are particularly applicable to automatic shoe machines of the type above referred to, certain features of the invention are also capable of use in other types of automatic machines or in machines in which the shoe is held in position by the operator. It is also to be understood that except as defined in the claims, the several features of the invention are not limited to any particular construction or arrangement of parts.

The machine hereinafter specifically described as embodying the several features of the present invention, is an automatic machine for sewing the welt and upper to the insole of a welted shoe, and as to the general construction and mode of operation of its various parts is similar to the automatic welt sewing machine disclosed in the applicant's Patent No. 1,952,770, dated March 27, 1934, and in the patent to Topham and the present applicant No. 1,616,714, dated February 8, 1927.

The objects of the invention are to simplify and improve the construction and mode of operation of various parts of welt shoe sewing machines, both of the automatic type above referred to, and of the type in which the shoe is presented to the machine while held in the hands of the operator.

Features of the invention contemplate the provision of a novel and improved welt slashing device, and a novel and improved welt cutting and feeding device.

Figure 3:
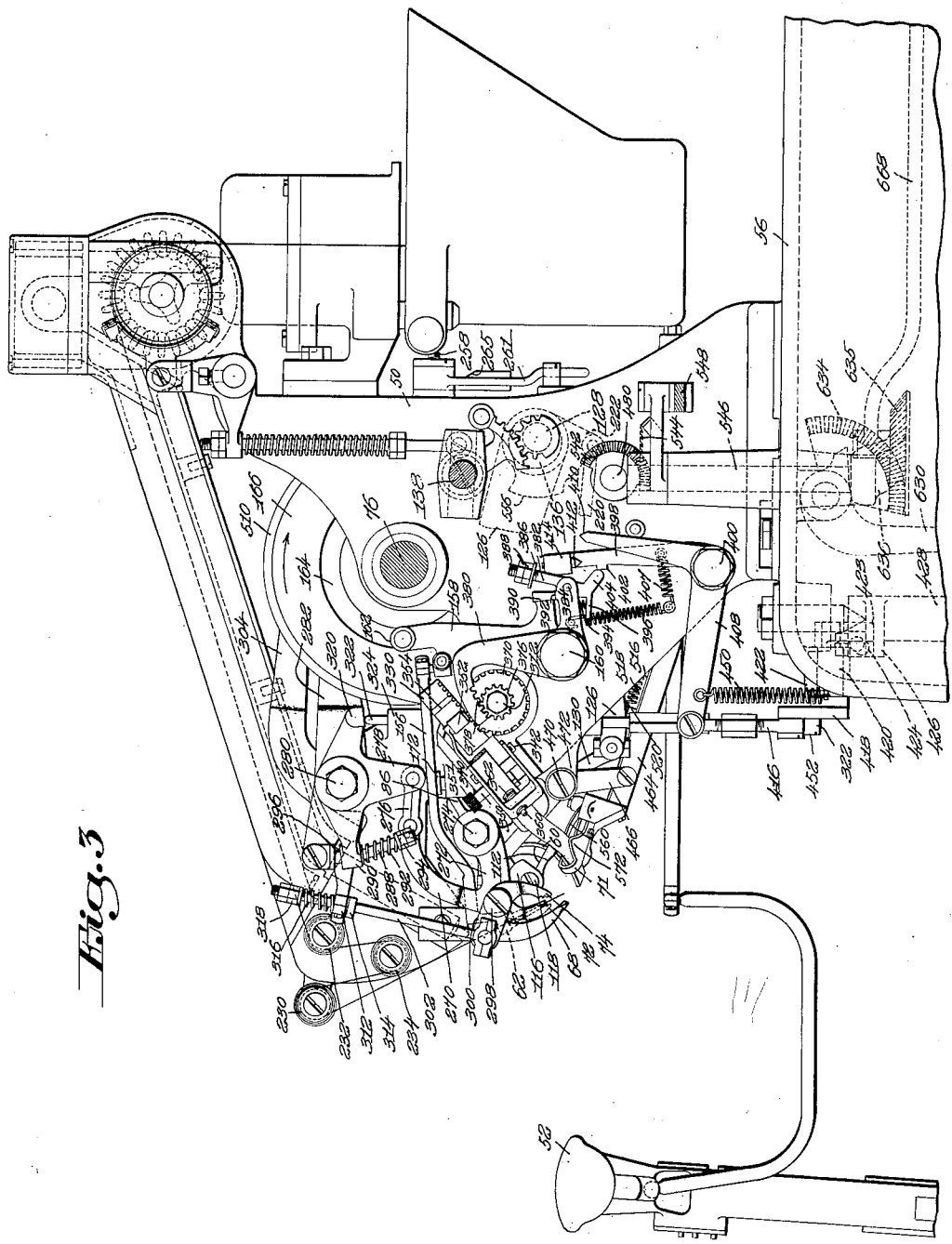
Figure 4:
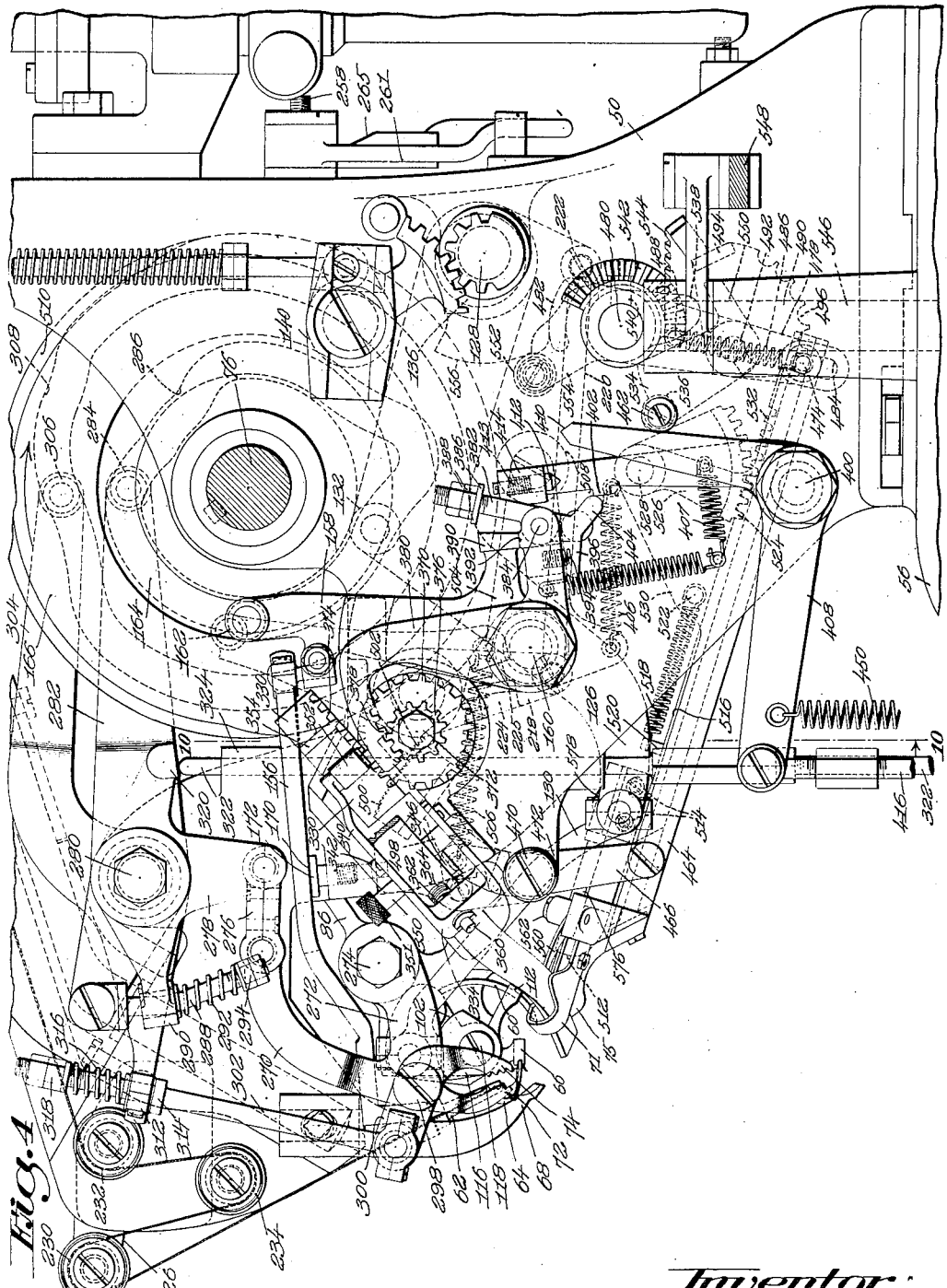
Figure 5:
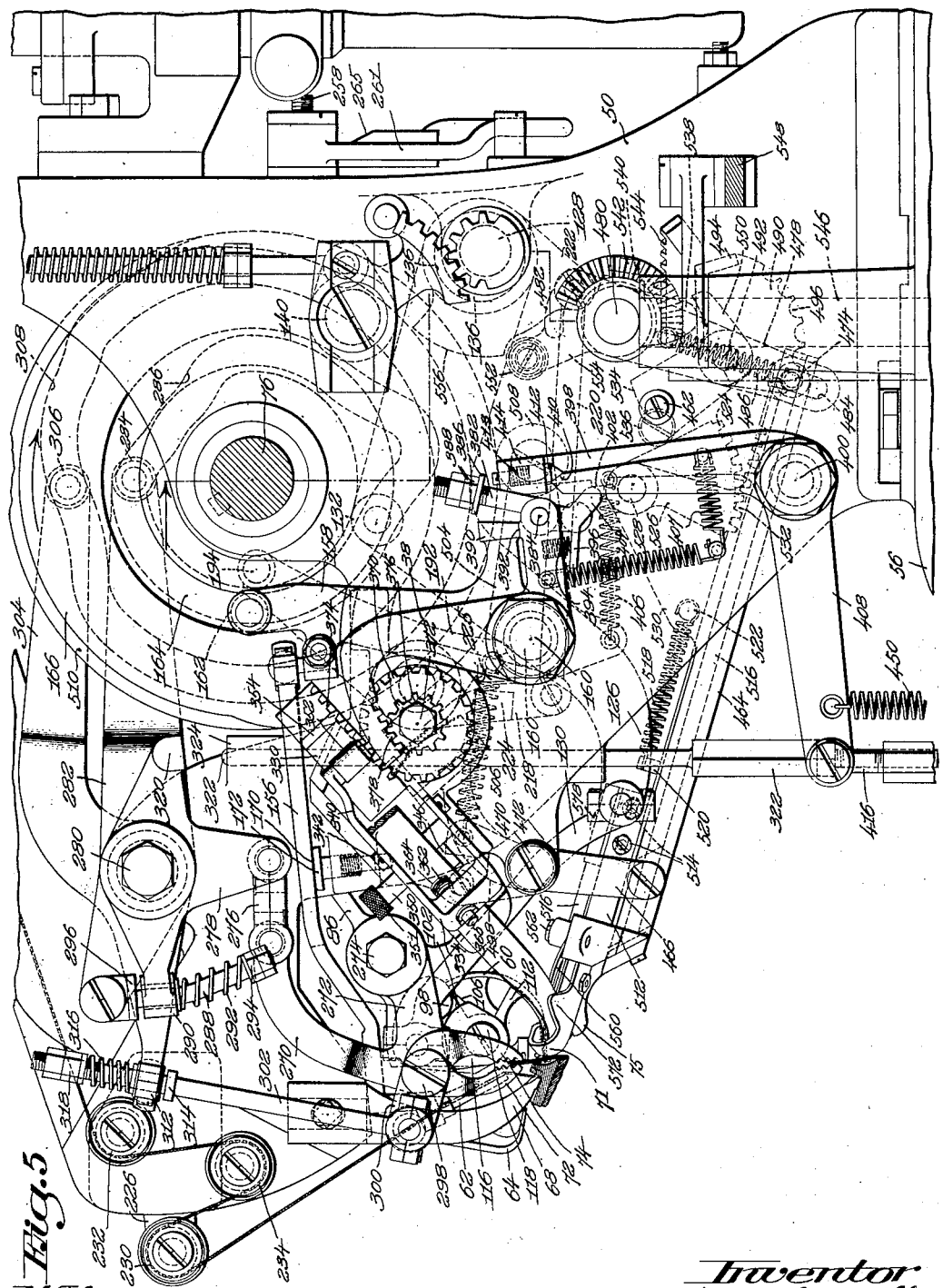
Figure 23:
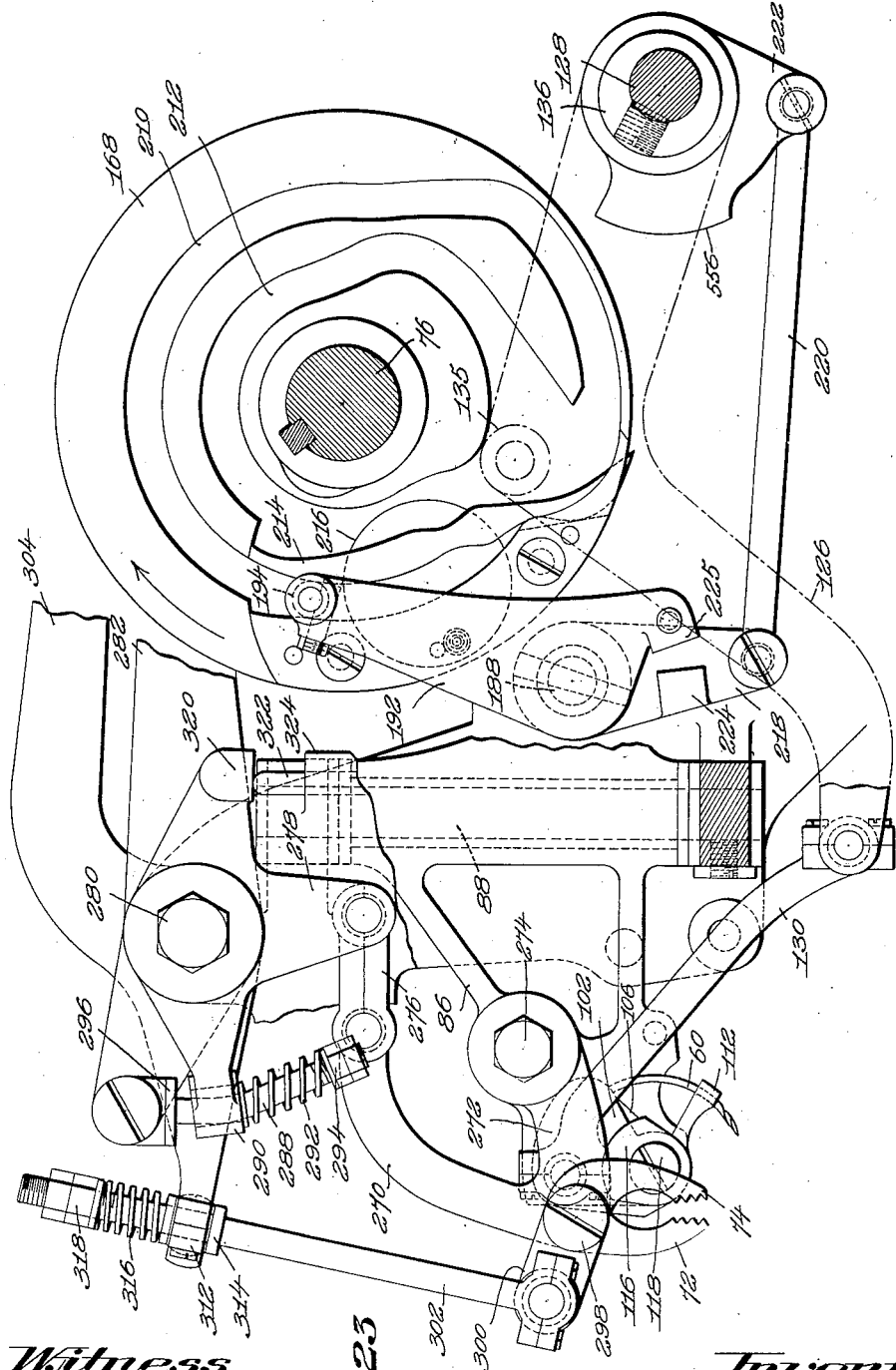

The several features of the invention consist also in certain devices, combinations and arrangement of parts hereinafter described and claimed, which together with the advantages to be obtained thereby will be readily understood by one skilled in the art from the following description taken in connection with the accompanying drawings, in which: Fig. 1 is a view in front elevation of an automatic lasting and welt sewing machine embodying the several features of the present invention; Fig. 2 is a front view partly in section of the driving and stopping mechanism; Fig. 3 is a view in right side elevation of the machine head with the parts shown in stop position; Fig. 4 is a view on a larger scale of the portion of the machine head as shown in Fig. 3 with various underlying parts indicated in dotted lines; Fig. 5 is a view similar to Fig. 4, the parts being shown in sewing position just prior to throwing the welt slashing mechanism into operation; Fig. 6 is a view in left side elevation of a portion of the machine head, the parts being shown in stop position; Fig. 7 is a sectional plan view of the machine head taken on the line 7—7 of Fig. 6; Fig. 8 is a view of the machine head in front elevation, the parts being shown in stop position; Fig. 9 is a plan view of the machine head; Fig. 10 is a sectional view in front elevation of the machine head taken substantially on the line 10—10 of Fig. 4; Fig. 11 is a detail view on an enlarged scale in right side elevation showing particularly the needle, welt guide and welt cutter actuating mechanisms; Fig. 12 is an enlarged detail view of the needle segment and needle guide as shown in Fig. 11, but with the cover plate and clamping screw for holding the needle segment and needle guide in position removed; Fig. 13 is a sectional view taken on the line 13—13 of Fig. 12 with the cover plate and clamping screw in position as shown in Fig. 11; Fig. 14 is a detail sectional view taken on the line 14—14 of Fig. 11; Fig. 15 is a detail sectional view taken on the line 15—15 of Fig. 11; Fig. 16 is a detail view in right side elevation partly in section of a portion of the welt guide and welt cutter actuating mechanism taken substantially on the line 16—16 of Fig. 17; Fig. 17 is a sectional view taken on the line 17—17 of Fig. 16; Fig. 18 is a detail view in right side elevation on an enlarged scale of a portion of the welt guide and welt cutter mechanism with the welt guide supporting member broken away to show underlying parts and the welt cutting knife retracted in normal sewing position; Fig. 19 is a view similar to Fig. 18 with the welt cutting knife advanced to sever the welt, and with the welt feed member retracted preparatory to feeding forward the welt; Fig. 20 is a detail plan view of the parts in the positions shown in Fig. 18; Fig. 21 is a detail plan view of the parts in the positions shown in Fig. 19; Fig. 22 is a detail view partly in section taken substantially on the line 22—22 of Fig. 21; Fig. 23 is an enlarged detail view showing in right side elevation the needle, thread finger and lasting gripper actuating mechanisms, the parts being shown in the positions they assume as the machine stops; Fig. 24 is a view similar to Fig. 23 with the parts shown in the positions assumed immediately upon starting the machine; Fig. 25 is a view similar to Figs. 23 and 24 with the parts including the lasting grippers in operation immediately after the completion of the first revolution of the cam shaft; Fig. 26 is a view illustrating the needle and thread finger actuating mechanisms, with the parts shown in the positions assumed during the normal operation of the machine in sewing a seam; Fig. 27 is a detail front view of the lasting grippers; Fig. 28 is a detail sectional view taken on the line 28—28 of Fig. 26; Fig. 29 is a view similar to Fig. 26 with the parts shown in the position immediately upon throwing the stop mechanism into operation; Fig. 30 is a detail sectional view taken on the line 30—30 of Fig. 29; Fig. 31 is a detail sectional view taken on the line 31—31 of Fig. 29; Fig. 32 is a view in right side elevation illustrating particularly the needle and lasting gripper mechanisms and their actuating cams; Fig. 33 is a detail view in right side elevation of the control mechanism for throwing the welt slasher into and out of operation, the parts being shown in position just prior to the beginning of the welt slashing; Fig. 34 is a view similar to Fig. 33 with the welt slashing mechanism in operation; Fig. 35 is a detail sectional view taken on the line 35—35 of Fig. 34; Fig. 36 is a view similar to Figs. 33 and 34, the parts being shown in position just prior to throwing the welt slashing mechanism out of operation; Fig. 37 is a view similar to Figs. 33, 34 and 36 showing the welt slashing mechanism out of operation; Fig. 38 is a sectional view taken on the line 38—38 of Fig. 36; Fig. 39 is a detail view illustrating the welt slashing mechanism with the welt slashing knife in retracted position; Fig. 40 is a view similar to Fig. 39 showing the knife in its advanced position making a slashing cut in the welt; Fig. 41 is a plan view of the parts shown in Fig. 40; Fig. 42 is a detail sectional view taken on the line 42—42 of Fig. 40; Fig. 43 is a perspective view showing the relative positions of the welt and the knife in slashing the welt; Fig. 44 is a detail view in left side elevation illustrating particularly the thread finger and the thread cutting and hoding mechanism, the parts being shown in stop position; Fig. 45 is a plan view of the parts shown in Fig. 44; Fig. 46 is a view similar to Fig. 44, the parts being shown in normal sewing position; Fig. 47 is a plan view of Fig. 46, parts being broken away to show particularly the positions of the thread finger and thread gripper; Fig. 48 is a view similar to Figs. 44 and 46 with the parts shown in position during the operation of the stop motion to stop the machine; Fig. 49 is a plan view of Fig. 48, the parts being broken away to show the corresponding positions of the thread finger and gripper; Fig. 50 is a view similar to Figs. 44, 46 and 48 after the thread finger has been actuated to grip and sever the thread; Fig. 51 is a plan view of Fig. 50, the parts being broken away to show the corresponding positions of the thread finger and gripper; Figs. 52, 53 and 54 are detail views illustrating the mechanism for supporting and locking the jack in position during the welt cutting operation, Fig. 52 illustrating the position of the parts during normal operation of the machine; Fig. 53 showing the parts in position with the jack depressed during the welt cutting operation, and Fig. 54 showing the parts in the position assumed when the machine finally stops; Fig. 55 is a detail sectional plan view showing particularly the cam and certain of its operating connections for throwing the lasting and welt slashing devices into and out of operation; Fig. 56 is a sectional view in front elevation, of the mechanism for locking the jack in its depressed position during the welt cutting operation; Fig. 57 is a side view of the parts shown in Fig. 56; Fig. 58 is a sectional plan view taken on the line 58—58 of Fig. 57; Figs. 59 and 60 are detail views illustrating different positions of the jack locking mechanism shown in Fig. 58; Fig. 61 is a detail plan view of the eccentric and connections actuated thereby forming a part of the auxiliary mechanism which is thrown into operation just prior to the final stopping of the machine; and Fig. 62 is a detail plan view of the feed carriage and the parts supported thereon.

The welt shoe sewing machine for sewing the welt to the upper and insole of a shoe while supported on a last herein disclosed as embodying in a preferred form the several features of the present invention, comprises a sewing head generally indicated at 50 within which the sewing and side lasting instrumentalities are housed, a shoe supporting jack comprising a toe support 52 and a heel support 54 pivotally secured thereto, a supporting base 56 within which is housed the supporting and actuating mechanisms for imparting the required feeding turning and tipping movements to the jack, and a driving and stopping unit for the machine which is housed in a casing 58 on the base adjacent to the sewing head 50.

As has been stated, the general construction and mode of operation of the various parts of the illustrated machine are similar to the corresponding parts of the automatic welt sewing machine disclosed in applicant's Patent No. 1,952,770 and in the patent to Topham and the present applicant No. 1,616,714. The machine is completely automatic in operation, the shoe being supported on the jack during the sewing operation, and tipping and rotating movements being imparted to the jack in timed relation to the feed of the shoe so as to maintain the shoe at all times in the proper position with relation to the sewing instrumentalities. At the completion of the sewing operation, the driving mechanism for the cam shaft in the head of the machine and for the pattern cam shaft in the base from which the jack is actuated and controlled, is thrown out of operation, and an auxiliary mechanism is thrown into operation which acts to perform certain additional operations including the completion of the rotation of the pattern cam shaft, the depression and outward movement of the jack away from the sewing instrumentalities, and the reverse rotation of the jack to its original position.

As in the machine of the patents above referred to, the devices of the present machine for operating upon a shoe comprise a curved hooked needle 60, a looper 62, a thread finger 64, a thread holder or gripper 66, a channel guide 68, and a welt guide 70. In addition to these devices the present machine also is provided with a side lasting gripper comprising jaws indicated respectively at 72 and 74. Cooperating movements are imparted to these devices for operating on the shoe from a sewing cam shaft 76 (see Fig. 1) which is mounted to rotate on a horizontal axis in bearings in the sewing head 50, and is provided at one end with a spiral gear 78 arranged to mesh with a corresponding spiral gear 80 which is formed integrally with a clutch sleeve 82 loosely mounted to turn on a vertical drive shaft 84 of the machine.

The shaft 84 is continuously driven through reduction gearing from an electric motor mounted in the upper end of the casing 58.

The control mechanism for imparting positioning and feeding movements to the jack, are arranged to impart a continuous feeding movement to the shoe past the stitch forming devices. To assist in the feeding of the work, the needle is mounted to reciprocate with the work in the line of feed. With the present construction, the needle 60 is mounted on a support or frame 86 (see Figs. 6, 7, 11 and 62) which extends rearwardly of the machine, and is sleeved to turn on a vertical pivot shaft 88. A rearwardly extending arm 90 formed on the hub of the support 86, carries a cam roll 92 which is arranged to engage in a peripheral cam groove in the cam disk 94 on the sewing shaft 76, so that a reciprocatory movement is imparted to the support and the needle mounted thereon in the line of feed in timed relation to the sewing cycle.

As best shown in Figs. 11, 12 and 13, the needle 60 is rigidly clamped by means of a cover plate 98 and a clamping screw 100 to a needle segment 102 which is loosely sleeved to turn on a stud 104 formed on a plate 106 which is secured to the support 86. A groove 108 is formed in the periphery of the needle segment to engage with a corresponding tongue 110 on the support 86.

The needle is supported by means of a needle guide 112 formed on a hub 114 which is loosely sleeved on the stud 104 and is held in position thereon by means of a cover plate 116 and a clamping screw 118. The needle guide is positively moved towards and from the work through connections with the needle segment comprising a ball 120 mounted in a perforation extending parallel with the axis of needle movement through a radical projection from the hub of the needle guide and arranged to engage alternately locking recesses 121 and 123 formed respectively in the adjacent faces of the needle segment 102 and the cover plate 116. The forward movement of the needle guide is limited by a fixed stop 124 projecting from the cover plate 116 into the path of a radially extending shoulder on the hub of the needle guide. When the guide is in this position the recess in the hub of the needle guide is opposite the recess in the cover plate so that the ball 120 can pass into the recess in the cover plate while the needle segment continues its forward movement. The needle guide remains locked in position by the ball during the retracting stroke of the needle segment until the recess in the needle segment comes opposite the recess in the hub of the needle guide. At this time a lug on the needle segment engages the radially projecting shoulder of the needle guide and during the continued backward movement of the needle segment the needle guide is also moved backwardly, the ball 120 moving from the recess in the cover plate 116 to the recess in the needle segment, and locking the guide to the needle segment during the continued backward movement of the needle segment and during the first portion of its forward movement. Oscillating movements are imparted to the segment 102 and needle 60 about the pivot 104 to advance and retract the needle through the work, by means of a cam lever 126 (see Figs. 3 to 5, 6, 10 and 29) pivoted on a rock shaft 128, and connected at its free end by means of a link 130 to the needle segment 102. A cam roll 132 on the cam lever 126 is arranged to engage with a needle actuating cam groove 134 (see Figs. 11 and 32) formed in one face of the cam disk 94.

The present machine is provided with means for causing the needle to mis-loop during the last cycle of the machine upon stopping, so that no thread will be caught on the needle hook and drawn through the work as the needle is retracted to its normal stop position out of engagement with the work. With the present construction, the needle cam lever 126 is mounted on an eccentric pivot 136 (see Fig. 11) secured to the rock shaft 128, so that a rocking movement imparted to the rock shaft will vary the position of the pivot, and correspondingly vary the limit of the advancing movement of the needle through the work to prevent thread from being laid in the needle hook.

The shaft 128 is rocked to vary the needle throw upon stopping the machine through connections comprising a rock shaft 138 (see Figs. 2, 3, 5 and 10) arranged in line with a short shaft 140 mounted in the frame of the sewing mechanism above and slightly in front of the shaft 128. The stop mechanism of the machine illustrated more particularly in Fig. 2 is similar to that disclosed in the patent to Topham No. 1,791,176, dated February 3, 1931, the shaft 138 being a portion of the lock bolt carrier of the stop mechanism disclosed in said patent. The shaft 138 is connected to the short shaft 140 by inter-engaging slotted blocks, the arrangement being such that the rocking of the shaft 138 during the operation of the stop motion imparts a corresponding rocking movement to the shaft 140. The shaft 140 is provided with a rearwardly and downwardly extending arm having a gear segment meshing with a corresponding segment secured to the outer end of the shaft 128. During the operation of the stop mechanism, the shaft 140 is rocked in a clockwise direction and is then returned partway to its original position. Through the connections above described a rocking movement first in a counterclockwise direction and then a partial return movement in a clockwise direction is imparted to the shaft 128. The eccentric 136 is thus shifted during the last stitch forming cycle to cause the forward movement of the needle to be shortened to such an extent that the thread is not laid in the needle hook during the operation of the looper, and the needle comes to rest out of engagement with the work with no thread in its hook.

The looper mechanism of the illustrated machine comprises the looper member 62 rigidly secured to the apex or tip of a triangular frame 156 (see Figs. 4 to 7 and 9), which at each of its two rear corners is connected by a universal joint to corresponding actuating cam levers 158. These levers 158 are mounted to turn on a pivot shaft 160, and are provided with cam rolls 162 arranged to engage respectively with cam grooves 164 formed in the outer faces of the cam disks 166 and 168 (see Figs. 5, 6 and 7). The frame 156 at its forward end is supported yieldingly in sliding contact with a bearing surface 170 by means of two spring-pressed plungers 172 mounted in corresponding recesses in the machine frame, and arranged to engage with and exert an upward pressure respectively on the two arms of the frame 156 intermediate their lengths. The operation of the actuating cam levers 158 is timed to move the forward end of the sliding frame 156 and looper 62 in a circular path to impart the required encircling movements to the looper around the needle.

The thread finger 64 (see Figs. 6 to 8 and 44 to 51) comprises a lever arm mounted at its upper end on a pivot stud 174 to swing in a vertical plane, and is connected through a link 176 to the upper end of a lever arm 180 sleeved on a pivot stud 182. Formed on the hub of the lever 180 is a gear tooth segment 184 arranged to mesh with a corresponding gear segment 186 on one end of a rock shaft 188 journaled in a bearing 190 in the machine frame (see Fig. 6), and provided at its other end with an upwardly extending cam lever 192. A cam roll 194 carried on the lever 192 is arranged to engage a cam groove formed in one face of the cam disk 168.

Mechanism is provided which is arranged upon stopping the machine to impart to the thread finger 64 an abnormal movement to bring the thread finger into engagement with a thread gripper 66 to grip the thread, and thereafter through the continued movement of the thread finger, to cause a thread cutting knife to advance and sever the thread. The thread finger and gripper are then partially retracted to permit the return of the knife to inoperative position while the thread remains held between the gripper and thread finger preparatory to the beginning of a new stitching operation. The thread gripper 66 (see Figs. 6 and 44 to 51) comprises a lever arm which is pivotally mounted on the stud 174 to swing in a vertical plane, and is forced yieldingly toward the thread finger by means of a spring 196 attached at one end to the gripper lever, and at its other end to the machine frame. The movement of the gripper 66 about its pivot is limited by the engagement of the upper end of the lever with a fixed stop 198 on the machine frame. The thread cutting knife which cooperates with the thread finger and gripper to cut the thread, is indicated at 200, and is formed on the lower end of an arcuate-shaped lever 202 (see Fig. 5) which is pivotally mounted intermediate its length to turn about a pivot 204 on the needle support 86, and at its upper end is provided with an offset nib 206 which extends into the path of movement of the gripper member 66. A tension spring 208 connected at one end to the arcuate-shaped lever 202 and at its other end to the needle support, tends to maintain the cutter in its retracted or inoperative position.

During the operation of the machine in sewing a seam, the thread finger, during each stitch forming cycle, engages the thread between the looper and the work, and draws aside a bight of thread as is usual in chain stitch inseam sewing machines. When the machine is stopped, the abnormal movement imparted to the thread finger brings the thread into contact with the gripper lever 66, and continued movement stretches a leg of the bight drawn out by the thread finger tightly between the end of the thread finger and the work. Upon actuation of the thread cutter lever 202 by the continued movement of the thread finger, and of the gripper lever 66, the cutting knife 200 engages the leg of the bight extending from the thread finger to the work and severs the thread, and upon the partial return movement of the thread finger the cutter lever 202 with the knife 200 is permitted to return to its original position while the end of the thread leading to the looper and to the supply is retained by the thread finger and gripper lever.

The construction above described constitutes a simple and efficient mechanism for controlling the position and operation of a thread cutting knife which maintains the knife well out of the path of the shoe during the sewing and which causes the knife, when rendered operative, to advance into position to sever the thread with certainty in close proximity to the work. The construction also has the advantage that the parts which come in contact with the thread do not tend to collect wax from the thread and as a consequence become cemented together while the machine is idle and offer considerable resistance to movement when the machine is again started. With the construction above described, there is no necessity of thoroughly cleaning the parts before starting the machine in order to avoid breakage or injury as is the case with prior constructions. In the construction above described relatively small thread engaging and contacting surfaces are provided between the gripper and thread finger, and these surfaces have operative movement directly away from each other so that a relatively small amount of force is required to separate these surfaces in starting the machine, and danger of injury to the machine on account of the sticking together of these parts is eliminated.

In order to impart the required abnormal movements to the thread finger in stopping and in starting the machine to cut and grip the severed end of the thread, and to hold this end during the formation of the first stitch of the new operation, two separate cam grooves 210 and 212 (see Figs. 23 to 29) are provided for the actuation of the thread finger cam lever 192, and a switch cam 214 which is similar in its general construction and mode of operation to that shown in the applicant's Patent No. 1,952,770. The switch cam 214, as in the application referred to, is arranged during the sewing operation to maintain the cam roll 194 in the inner cam path or groove 212. Upon stopping the machine, the cam lever 192 is moved positively to the left in timed relation to the rotation of the cam shaft 76 to swing the switch cam 214 about its pivot 216, and move the cam roll 194 into the outer groove or path 210. The mechanism through which this operation is carried out, comprises a lever arm 218 loosely hung on the rock shaft 188, and connected through a link 220 with an arm 222 on the rock shaft 128. An abutment 224 on the lever arm 218 is arranged upon the rocking of the shaft 128 by the operation of the lock bolt carrier as above described in stopping the machine, to engage with an abutment 225 on the hub of the cam lever 192 to positively move the cam lever and roll 194 outwardly into the groove 210. The thread take-up of the present machine, as best shown in Figs. 6, 8 and 9, comprises a lever arm 226 which is pivoted on a shaft 228 on the machine frame, and is provided at its outer end with a guiding roll 230. The thread coming from the supply passes over a stationary roll 232 around a stationary roll 234, over the roll 230, and from there to the looper member 62. At its inner end the take-up lever 226 is provided with a cam roll 236 which is arranged to engage with a cam surface 238 formed in one face of the cam disk 94. A spring 240 coiled about the pivot shaft 228 and secured at one end to the take-up lever arm 226, tends to move the outer end of the take-up lever upwardly to tension the thread.

The shape of the cam surface 238 is such that the take-up is actuated positively to set the stitch and draw thread for the next stitch through the tension. At all other times the take-up is supported by the spring 240 and exerts a yielding tension on the thread during the action of the thread finger and looper in threading the needle and during the backward stroke of the needle in tightening the stitch. Overthrow of the take-up lever while being positively actuated to set the stitch and draw thread from the tension is prevented by the engagement of the roll 236 on the take-up lever with a raised portion of a cam surface 242 which is complementary to the cam surface 238 above referred to.

A novel and improved thread break stop is controlled by the take-up lever 226, and is rendered operative upon breaking of the thread to stop the machine. This mechanism comprises a vertically situated lever 244 (see Fig. 6) pivoted at 245 on the machine frame, and at its lower end arranged to engage with one arm of a lever 246 (see Fig. 7), which lever is one of a series through which motion of the lever 244 is transmitted to the lever 247 of the stop mechanism illustrated in Fig. 2. At its upper end the lever 244 has pivotally secured thereto, an arm 248 which intermediate its length carries a cam roll 250 arranged to engage a cam 252 on the cam shaft 76, and is arranged to extend into the path of a latch 254 formed on the rear end of the take-up lever 226. The arm 248 is pressed yieldingly to the right, as shown in Fig. 6, to maintain the roll 250 in engagement with the cam 252 by means of a compression spring 256 which is coiled about a rod 258 pivotally secured at its inner end to the arm 248 and at its outer end arranged to slide in a bearing 260. During the normal operation of the machine, the lever 244 will be maintained in the position shown in Fig. 6, and an idle oscillatory movement will be imparted to the arm 248 in timed relation to the rotation of the cam shaft 76 through the action of the spring 256 and rod 258. When the thread breaks during the operation of the machine, the take-up lever 226 is permitted to move about its pivot 228 by the pressure of the spring 240 to bring the cam roll 236 into engagement with the inner cam surface 242, so that as the roll moves onto the low portion of the cam, the latch 254 will fall behind the tip of the arm 24. With the continued rotation of the cam shaft 76, the roll 250 on the arm 248 will ride onto the high portion of its cam, causing the arm 248 to be turned about the latch 254 as a pivot, so that the lever 244 is moved about its pivot to throw the stop motion into operation.

Inasmuch as the take-up lever 226 is maintained in position against the pressure of the spring 240 only by the thread, it is desirable to provide means for preventing the engagement of the latch 254 with the thread stop mechanism in starting the machine, where for instance, the sewing operation is begun with a new length of thread which is not held in position by the thread gripper. For this purpose an abutment indicated at 262 in Fig. 6, is formed on the take-up lever 226, and is arranged to project into the path of a nub 264 on the thread finger actuating lever 192 while travelling in its outer groove 210. The movement of the thread finger cam lever 192 into its normal operating position under the influence of the switch cam 214 after the end of the first revolution of the cam shaft in starting the machine, causes the nub 264 to move out of the path of the abutment 262 on the take-up lever 226.

To permit the cam shaft of the machine to be turned over by hand or the machine to be run regardless of whether the machine is properly threaded or is without thread, means are provided for locking the thread brake stop permanently out of operation. As illustrated, this means comprises a manually operable lever 261 (see Figs. 6 and 7) pivotally mounted on the frame of the machine and provided with a slot through which the outer end of the rod 258 passes. The lever 261 is interposed between the bearing 269 for the rod 258 and nuts 263 on the other end of the rod, and is provided with an inclined cam surface 265, so arranged that a movement of the lever 261 upwardly from the position illustrated in Figs. 6 and 7, forces the rod 258 to the rear and withdraws the roll 250 from the cam 252.

The machine illustrated in the drawings is provided with a side lasting gripper which acts progressively along the sides of the shoe to pull in and position the side portions of the upper with relation to the welt and insole in advance of the sewing operation. In the illustrated construction, the operation of the side lasting gripper is automatically controlled as the sewing operation progresses around the shoe to cause the gripper to operate intermittently and progressively along the side of the shoe in time with the stitch forming devices to cease operating as the sewing proceeds about the toe which has preferably been previously molded, and finally to resume operation again as the sewing is continued along the other side of the shoe. As shown in Figs. 4, 5, 23 to 25 inclusive, and 32, the gripper is located adjacent to and immediately in advance of the needle in the line of feed, and is mounted on the needle support to move with the needle in the line of feed. The jaw 72 comprising one of the cooperating members of the gripper is rigidly formed on a curved carrier arm 270 which is provided with an offset portion 272 pivotally secured at 274 to the needle support 86. At its upper end the arm 270 is connected through a link 276 to a downwardly extending arm of a lever 278 sleeved to turn on a pivot shaft 280 mounted on the machine frame. The lever 278 is rocked about its pivot to impart movements to the gripper jaw 72 toward and away from the work by means of a cam actuated lever 282 pivoted on the shaft 280, and provided at one end with a cam roll 284 arranged to ride in a cam groove 286 formed in one face of the cam disk 166 (see Fig. 9). At its forward end the cam lever 282 is pivotally connected to a curved rod 288 which is loosely fitted to slide in a sleeve bearing 290 formed in a forwardly extending arm of the lever 278. A compression spring 292 coiled about the rod 288 between a nut 294 on the rod and the sleeved portion of the lever 278, tends to rotate the lever 278 in a clockwise direction to hold the forwardly extending arm in yielding engagement with a collar 296 on the pivoted upper end of the rod 288. With this arrangement of the parts, the lever 278 is moved yieldingly in one direction under the pressure of the spring 292 to move the gripper jaw 72 towards the work, and is moved positively in an opposite direction to retract the gripper jaw by the engagement of the sleeved portion 290 of the lever 278 with the shoulder 296. Cooperating with the gripper jaw 72 is a second jaw 74 pivotally mounted thereon at 298, and provided with a forwardly extending arm 300 which is connected by means of a link 302 to the forward end of a cam lever 304 loosely pivoted to turn on the pivot shaft 280, and provided at its rear end with a cam roll 306 which engages in a corresponding cam groove 308 in the face of the cam disk 166. In order to provide a yielding gripping engagement of the two jaws, the link 302 is arranged to slide in a corresponding aperture 312 in the forward end of the cam lever 304. The movement of the link 302 with relation to the cam lever 304 is limited in one direction by the engagement of the lever 304 with a collar 314 formed on the link 302, and in the other direction by means of a compression spring 316 coiled about the upper end of the link 302 between the sleeved portion of the lever 304 and an adjustable nut 318 on the link 302.

The gripping jaws engage the upper close to the sewing point and are actuated during each stitch forming cycle to tension the upper until the needle enters the work, at which time the grasp on the upper is released, and the upper is left free to be drawn into its final position against the shoulder of the insole. The pivotal point 274, about which the gripper carrier 278 swings, is located above and to the rear of the sewing point in such a position that the gripping jaws mounted on the carrier move over the sole of the shoe simultaneously with their rising movement so that the movement of the gripper carrier imparts a combined updraw and overdraw movement to the jaws. A simple and efficient lasting gripper mechanism is thus provided, and comparatively simple and direct connections between the gripping jaws and the cam shaft can be utilized for closing the jaws and giving them the required upper-tensioning movements.

To enable the gripper to be thrown out of operation, the lever 278 is provided with a rearwardly extending arm provided with a bearing surface 320 arranged for engagement with the upper end of a lengthwise movable and vertically arranged control bar 322 which is journalled through a bearing 324 in the machine frame. With this construction and arrangement of parts, a vertical upward movement of the control 322 will move the lever 278 about its pivot in a counterclockwise direction against the pressure of the spring 292 to raise the gripper jaw 72 and the jaw 74 cooperating therewith out of operative engagement with the work against the pressure of the spring 292. The control bar 322 is actuated to throw the gripper jaws out of and into operation when predetermined points on the shoe are reached during the sewing operation through connections to the pattern cam shaft, as will be hereinafter described.

The novel and improved welt slashing device of the machine (see Figs. 4, 5, 8, 33 to 43 inclusive) comprises a welt slashing knife 330 which is arranged to slide in a guideway formed in a bracket 334 on the machine frame, and is provided with an oblique cutting edge indicated at 332. In order to position the welt with relation to the welt slashing knife, the welt is arranged to pass over a guiding surface 336 formed in the bracket 334, and is also supported on a curved guiding surface 338 formed on a guiding member 340 which is pivotally secured at 342 to the bracket 334. The welt is positioned laterally in the guiding member 340 between a side plate 344 forming part of the member 340 which engages the channel edge of the welt and an adjustable block 346 which is mounted on the end of a pin 348 journaled to slide in a bearing 349 formed in the bracket 334 and screw-threaded at its other end to receive a sleeve nut 350. A knurled head 351 on the sleeve nut 350 provides a convenient means for enabling the operator quickly and accurately to adjust the position of the block 346 to conform to the width of the welt strip. The guiding member 340 is provided at its rear end with a cam roll 352 which is arranged to engage with a cam surface 354 on the under side of the knife, so that on each forward reciprocation of the knife, the cam roll 352 riding on the surface 354, will cause the guiding member 340 to be rotated about its pivot 342 to bring the welt into the path of the knife. For tensioning the welt and to maintain it accurately in position on the guiding surfaces above described during the operation of the knife, a frictional braking device is provided comprising a pin plunger 360 journaled in the guiding member 340, and a compression spring 362 coiled about the plunger between the guiding member 340 and a frictional disk 364 formed on the inner end of the plunger. A collar 366 mounted on the outer end of the plunger 360 and held in place by a cross pin 368, limits the movement of the plunger under the pressure of its spring 362.

In the preferred form of this feature of the invention herein disclosed, the welt slashing knife is mounted to reciprocate towards and from the welt in the line of feed of the welt with the flat side of the knife blade in a plane extending parallel to the flesh side of the welt in a direction transversely of the welt, and with the obliquely extending knife edge arranged to cut a slash ending at a fixed distance in from the channel edge of the welt as determined by the location of the guiding surface formed by the side plate 344 with relation to the reciprocating knife. The guiding surface 338 is curved and is located in relation to the braking device above described and the cooperating surface 336, so that the movement of the guiding member 340 about its pivot as the knife is advanced will bend the welt and cause the knife to cut tangentially into the curved outer or flesh surface of the welt. The movement of the guiding member 340 and welt supported thereon into the path of the knife, is limited to leave approximately a $\frac{1}{32}$" thickness of welt below the plane of movement of the knife blade.

As best shown in Figs. 40 and 43, the cooperative movements of the welt guiding member 340 and the oblique blade of the welt knife, cause a shearing cut to be made in the flesh side of the welt which extends partially through the welt strip to within a predetermined distance of the grain side of the welt, and at the same time extends across the flesh side of the welt nearly to the welt channel. With this arrangement of the welt slashing device, it will be seen that a slashing cut will be made which will leave substantially the same amount of stock intact so as not to unduly weaken the welt, and yet to permit it to be readily turned about the toe of the shoe regardless of any variations in the thickness or the width of the welt being used. In view of the fact that the cut will extend only to a predetermined depth, and thereafter run substantially parallel to the grain side of the welt, a wide latitude can be permitted in the adjustment of the forward throw of the knife blade without substantially affecting the efficiency of the device.

The connections through which reciprocating movements are imparted to the knife for slashing the welt, comprise a pinion 370 secured to a rock shaft 372, and arranged to engage with a rack 374 formed on one edge of the shank of the sliding knife 330. A second pinion 376 on the shaft 372, engages a gear segment 378 formed on a horizontally extending arm of a bell-crank 380 loosely sleeved to turn on the pivot shaft 160. The bell-crank lever 380 is oscillated about its pivot to reciprocate the welt slashing knife, when rendered operative, by means of a latch connection which is arranged to lock the bell-crank 380 to move with one of the cam actuating levers 158 for the looper. This connection comprises a latch 382 pivoted at 384 on the laterally extending arm of the bell-crank 380, and provided at its upper end with a flange 386 adjustably positioned by locking nuts 388 to engage and lock a laterally extending arm 390 of the cam lever 158 between the flange 386 and an abutment 392 on the bell-crank 380. A compression spring 394 seated in a recess formed in the bell-crank 380 and arranged to bear against an arm 396 on the latch 382, tends to hold the latch in locking engagement with the arm 390 of the cam lever 158. The latch 382 is normally held in inoperative position out of engagement with the cam lever 158 to maintain the welt slashing device inoperative, by means of a lever 398 which is loosely mounted to turn on a pivot shaft 400, and is provided with an abutment 402 arranged to engage with a nib 404 on the lower end of the latch 382. A tension spring 407 connected at one end to the lever arm 398, tends to maintain the abutment 402 in engagement with the nib 404 on the latch 382 to hold the latch in its inoperative position.

The latch release lever arm 398 is moved away from the latch 382 against the pressure of the spring 407 to release the latch and permit the bell-crank 380 to be locked into operative relationship to the cam lever 158, and is later caused to return and disengage the latch through connections which are operated from the pattern cam shaft of the machine to automatically cause the slashing of the welt only around the toe portion of the shoe. These connections comprise a bell-crank lever 408 which is pivotally mounted to turn on the pivot shaft 400, and has an upwardly extending arm provided at its upper end with a V-shaped cam surface 410 which is arranged to engage with a corresponding V-shaped detent pin 412 journalled to slide in a bearing 414 in the upper end of the latch release lever 398. A spring 413 coiled about the pin 412 between a shoulder formed in the bearing 414 and an enlarged portion of the pin tends to hold the pin in a depressed position in the path of the cam surface 410 of the lever 408. The horizontal arm of the bell-crank 408 is connected through a link 416 to a lever arm 418 (see Figs. 1, 3, 8, 54 and 55) which is secured to the forward end of a rock shaft 420 journaled in a bearing 422 in the base 56 of the machine. A downwardly extending arm 423 secured to the rear end of the rock shaft 420, is connected by a horizontal link 424 to an arm 426 secured to a vertical rock shaft 428. Another arm 430 on the rock shaft is connected by a link 432 to one end of a cam actuated lever 434 which is loosely mounted to turn on a shaft 438, and carries at its other end a cam roll 440 which engages with a cam 442 on the pattern cam shaft 444 of the machine. A tension spring 450 connected at one end to the horizontal arm of the bell-crank 408 and at its other end to the machine frame, tends to maintain the upper arm of the bell-crank to the left as shown in Fig. 5, and acts through the intervening connections described, to hold the cam roll 440 in engagement with its cam 442. The lower end of the control shaft 322 for throwing the side lasting grippers out of operation, is also pivotally connected at its lower end at 452 to the lever arm 418 (see Figs. 1 and 8), so that the operation of this mechanism is also controlled from the cam 442.

In the performance of the sewing and side lasting operations around the shoe sole, the side lasting grippers commence operating when the machine is thrown into operation from the starting position at the shank, are thrown out during the sewing operation around the toe, and are again rendered operative as the stitching operation returns along the other side of the shoe to the shank. The slashing devices, on the other hand, are inoperative at the beginning of the sewing operation, and up to a point somewhat in advance of the time when the point of operations reaches the toe, and are then thrown into operation only to slash that portion of the welt which is to be laid about the toe, being then again disconnected. The several steps in the operation of the mechanism controlled by the cam 442 for automatically throwing the side lasting and welt slashing mechanisms into and out of operation, are illustrated in Figs. 3, 4, 5, and 33 to 37 inclusive. As shown in Figs. 3 and 4, the machine is in stop position with the lever arm 418 fully raised, the upper arm of the bell-crank 408 being shown at the limit of its movement to the right, and with the control bar 322 fully raised into engagement with the lever 278 to raise the lasting gripper out of operating position. Upon starting the machine, the cam roll 440 rides onto a low portion of the Baltimore cam 442, causing the lever arm 418 to be depressed, moving the V-shaped portion 410 of the bell-crank 408 past the spring detent 412 to the extreme left as shown in Figs. 5 and 33, and depressing the control rod 322 to allow the lever arm 278 to move about its pivot under the pressure of the spring 292, so that the lasting gripper is brought into operating position with relation to the work. In order to start the slashing devices as the point of operation approaches the toe of the shoe, the cam roll 440 is arranged to ride onto a somewhat higher portion of its cam, slightly raising the arm 418 and moving the bell-crank 408 about its pivot, so that the upper end 410 of the bell-crank moves the latch release lever 398 away from the latch 382 to permit the latch under the pressure of its spring 394 to be moved into locking engagement with the arm 390 of the looper actuating cam lever 158. The parts in this position are illustrated in Fig. 34. The control bar 322 has not at this time been raised sufficiently to interfere with the operation of the side lasting grippers. When the toe is reached, the cam roll 440 rides onto a still higher portion of its cam 442 to further raise the lever arm 418, moving the bell-crank 408 to the position shown in Fig. 37, and at the same time causing the control bar 322 to engage with and rock the lever 278 to throw the lasting grippers out of operation. While the point of operation is progressing about the toe, the cam roll 440 rides onto a still higher portion of the cam 442, further raising the arm 418 and moving the upper end of the bell-crank 408 to its extreme position to the right as shown in Fig. 37.

This movement of the bell-crank 408 causes the V-shaped cam 410 to ride under the spring detent 412 as the further movement of the latch release lever 398 is positively arrested by engagement with the stop 462, so that the lever 398 is permitted to move again to the left under the pressure of its spring 406 to disengage the latch 382 and disconnect the slashing mechanism (see Fig. 37). As the point of operation now passes from the toe to the side portion of the sole, the cam roll 440 rides again onto the low portion of the cam 442, depressing the arm 418 to permit the resumption of the side lasting operation, the parts being now in the position shown in Fig. 3.

The welt guide of the present machine (see Figs. 4 to 6, 8, 10, 11 and 14 to 20) comprises a sheet metal loop 71 and an edge gage 73 corresponding to the welt guiding means, and edge gage of the welt guide commonly used in welt sewing machines. Cooperating with these parts is an arm 75 which is located in the plane of the needle, and the outer end of which is shaped to bear against the edge of the welt and to extend a short distance over the upper surface of the welt. The loop 71, the edge gage 72 and the arm 75 are rigidly secured to the forward end of a welt guide support or bar 464 supported at its forward end on two parallel links 466 which are connected to form a single yoke by a cross piece 468, and are provided with bearing pins 470 journaled to turn in bearings 472 in the machine frame (Fig. 7). At its rear end the bar 464 is supported by means of a cross bar 474 on a frame which comprises two vertical arms 478 loosely sleeved on a pivot shaft 480 and connected at their upper ends by a cross piece 482. In order to provide for an adjustment in the position of the welt guide with relation to the work, the supporting rod 474 for the rear end of the welt guide support 464 is arranged for vertical movement in slots 484 formed in the arms 478, and is held yieldingly in a raised position against an adjustable stop by means of two tension springs 486 which are connected respectively to the ends of the rod 474 and to pins 488 formed in the arms 478. The adjustable stop for determining the vertical position of the rod 474 comprises two plates 490 mounted to turn on a pivot shaft 492 journaled through the two arms 478, and connected by a cross piece 494. Each of the plates 490 is provided with a series of identical cup-shaped recesses 496 arranged at varying distances from the pivot 492 to receive the rod 474. The upward pressure of the springs 486 tends to hold the rod 474 in locking engagement with the cup-shaped surfaces 496 to hold the plates 490 in their adjusted position.

The welt guide is held yieldingly in engagement with the work at all times during the operation on a shoe, and during a part of each cycle is rigidly locked in position through mechanism which comprises an arm 498 forming an upward extension of one of the links 466 (see Fig. 11), and provided at its upper end with a rack tooth segment 500 which is arranged for engagement with a corresponding rack 502 formed on one arm of a cam actuated locking lever 504. A tension spring 506 secured at one end to the arm 498 and at its other end to the lever 192 tends to rotate the links 466 about their pivot 470 to maintain the welt guide in yielding engagement with the work. The cam actuated locking lever 504 is loosely mounted to turn on the pivot shaft 166, and carries on its other arm a roll 508 which is arranged to engage with a peripheral cam 510 on the cam disk 166, being held yieldingly in contact therewith by means of the tension spring 406 which is connected at its forward end to a downwardly extending arm of the cam lever 504.

Another feature of the present invention consists in the provision of a novel and improved mechanism for severing the welt and for positioning the severed end for the beginning of the next succeeding operation on a shoe. This mechanism (see Figs. 4, 5, 6, 10, 11, and 18 to 22 inclusive) comprises a welt cutting knife 512 which is mounted to slide on the welt guide support so that these parts are combined into a single compact unit arranged to permit the welt to be severed at the end of the operation as close as possible to the last stitch. The knife 512 is secured by two set screws 514 to the forward end of a slide 516 which is mounted in a T-shaped guideway formed in the bar 464. As best shown in Figs. 8 and 18 to 22 inclusive, the knife 512 is arranged to slide across the edge of the welt guide 70 adjacent the needle to sever the welt close to and in advance of the sewing point. The slide 516 and the knife 512 are normally held in a retracted inoperative position by means of a tension spring 518 connected at one end to a pin 520 on the slide 516, and at its other end to a pin 522 rigidly mounted on the welt guide support 464.

The welt cutting knife 512 is actuated to sever the welt through connections which are operated from the auxiliary mechanism for completing the revolution of the pattern cam shaft and for returning the jack to rest position, and act to advance the knife after the formation of the last stitch, and after the depression of the jack but prior to the movement of the jack forwardly out of operative position. These connections (see Figs. 3, 4, 10 and 13) comprise a gear segment 524 formed on an arm 526 which is hung on a supporting pivot 528 between two plates 530 formed on the bar 464, and is arranged to mesh with a rack 532 on the slide 516. The movement of the arm 526 to advance the knife, is controlled by means of a lever 534 loosely mounted to turn on the pivot shaft 492 on the arms 478, and provided with a roll 536 which is arranged to engage with the arm 526. The lever 534 is moved about its pivot to advance the knife and again to permit the knife to be returned to its retracted position under the pressure of its spring 518 by means of a cam 538 rigidly secured by a set screw 540 to the rock shaft 480. The movement of the rock shaft 480 is controlled from the auxiliary mechanism above referred to, through connections which comprise a gear segment 542 formed on one end of the rock shaft 480, and arranged to mesh with a corresponding gear segment 544 formed on the upper end of a vertical shaft 546. This shaft 546, through the eccentric strap and link 548 is rocked by the eccentric of the auxiliary mechanism when the machine is stopped and forms a part of the connections for performing the operations of disengaging the jack from the sewing devices and of completing the rotation of the pattern cam shaft of the machine, to cause the jack to be rotated in a reverse direction to its starting position. The rocking of the shaft 546 in one direction under the influence of the eccentric, causes the cam 538 on the horizontal rock shaft 480 to be moved from the rest position illustrated in Fig. 16 to the position shown in Fig. 11, engaging and rocking the lever 534 to rotate the arm 526 and advance the slide 516 and knife 512 to sever the welt. As the eccentric above referred to completes its movement, the shaft 546 is rocked in an opposite direction, so that the cam 538 is returned again to its rest position, as shown in Fig. 16. The cam 538 during its return movement is arranged to engage with an arm 550 on the lever 534 to rock the lever in a reverse direction and release the arm 526, permitting the slide 516 and knife 512 to be again retracted to rest position under the pressure of the spring 518.

Prior to the operation of the eccentric mechanism above described to advance the knife 512 to sever the welt, the bar 464 and welt guide 70 are retracted from the work in timed relation to the rotation of the sewing cam shaft 76 and are rigidly held in a predetermined position to insure constant operating conditions for the welt cutting mechanism, and to prevent possible interference of the knife with the shoe. For this purpose a cam roll 552 is mounted on an arm 554 formed integrally with one of the arms 478, and is arranged to engage with a cam 556 rigidly secured to the rock shaft 128 which as above described, is controlled by the operation of the lock bolt carrier of the stopping mechanism to cause the mis-looping of the needle in the last cycle of operation of the machine. The cam 556 is positioned so that upon the initial movement of the lock bolt carrier, the roll 552 will ride onto the high portion of the cam 556, and be maintained in this position as the lock bolt carrier is partially returned to its final stop position. When the lock bolt carrier is permitted to return to its operating position upon starting the machine, the shaft 128 and cam 556 are returned to the position illustrated in Fig. 4 to release the welt guide, and allow it to be returned into yielding engagement with the work under the influence of the spring 506.

The machine herein disclosed is also provided with a novel and improved mechanism which acts in timed relation to the operation of the knife to feed the severed end of the welt through the welt guide to position the welt for the start of the next succeeding operation on a shoe. This mechanism, as best shown in Figs. 15 to 19 inclusive, comprises a welt feeding arm 560 which is pivotally mounted at 562 on the bar 464, and carries at its free end a sleeve bearing 564 arranged to receive a welt feeding point 566. A compression spring 568 (see Fig. 22) coiled about the pin between a shoulder on the bearing and a shoulder on the pin, tends to hold the pin in yielding engagement with the work. A small cross pin 570 on the outer end of the feed pin limits its advancing movement under the pressure of the spring 568. The welt guide is provided on its under side with a flange 572 which extends under and supports the welt in the path described by the feed point 566, the upper portion of the welt guide being correspondingly cut away as indicated at 574 to permit a maximum forward movement of the feed point. The feed arm 560 is reciprocated to engage with and feed the welt through connections actuated by the advancing and retracting movements of the slide 516 and knife 512 which comprise a slotted member 576 rigidly secured by a set screw 578 to the slide 516, and arranged to engage with an arm 580 forming a rearward extension of the feed lever 560. During the advancing movement of the slide 516 and the knife 512, the arm 580 is engaged by a shoulder 582 forming one end of the slot in the member 576, and causes the feed arm 560 to be rotated to the position shown in Fig. 21. As the knife is then retracted to its inoperative position after severing the welt, the arm 580 is engaged by a shoulder 584 forming the other end of the slot in the member 576 to swing the feed arm 560 about its pivot in an opposite direction and feed the welt through the welt guide into position for the beginning of a new shoe sewing operation. With this arrangement and construction of the parts, it will be noted that the welt feeding device engages with the welt at a point not far from the end thereof and at a point where it is supported by the welt guide, so that the welt is pulled or dragged rather than pushed forward except for a comparatively short length between the end of the welt and the point of engagement with the feed point. A certain and accurate operation of the feed point is thus secured, which will be in no wise affected by differences in the qualities of sponginess or softness of the welt. The short length of welt in front of the feed point is adequately supported by the welt guide, and is readily crowded forward without liability of jamming or doubling over.

The shoe supporting jack comprising the toe support 52 and the heel support 54 pivotally secured thereto, is supported, actuated and controlled as in the machines of the patents above referred to (see Figs. 1 and 54). At its lower end the jack is mounted by a universal joint on the forward end of a horizontal arm or lever 590 which is pivotally mounted on a support 592 to move in a vertical plane, which support is pivotally mounted for movements in a substantially horizontal plane on a supporting member 594. The forked lower end of the member 594 carries trunnions 596 arranged to engage with corresponding bearings 598 in the machine frame. The movements of the several members of the jack are controlled through connections actuated by cams on the pattern cam shaft.

For supporting and controlling the position of the jack in starting and stopping the machine, there is also provided the usual control bar 624 which is connected at its forward end to an intermediate portion of the jack toe support 52 and at its rear end to an upwardly extending arm 626 pivotally secured at 628 to the machine frame. In stopping the machine the bar 624 is depressed and then moved forwardly to disengage and move the jack and shoe supported thereon away from the shoe operating devices by means of a frame or trap door 630 which is swung downwardly about its pivot into engagement with a hook 632 on the bar. As best shown in Figs. 54 and 61, the trap door or frame 630 carries a gear tooth segment 634 which meshes with a segment 635 formed on a lever arm 636 secured to the vertical rock shaft 546 which is actuated from the eccentric of the auxiliary mechanism. These segments 634 and 635 are constructed to provide a lost motion in the connections so that a dwell is produced in the movement of the frame 630 between the operations of depressing and advancing the jack to inoperative position. The construction and operation of these parts is similar to that of the mechanism disclosed in Patent No. 1,952,770 above referred to. It is contemplated that a wide range of commercial lasts may be used on the illustrated machine with varying heel heights. As a consequence the control bar 624 at the end of the operation on the shoe, may occupy any one of several positions in a vertical plane with relation to the trap door or frame 630. Under these conditions the movement of the trap door about its pivot sometimes has a tendency to force the jack outwardly during its depressing movement with consequent interference of the shoe with the shoe operating and guiding mechanisms, and interference with the proper operation of the welt cutting devices to cut the welt at this time.

A feature of the present invention therefore contemplates the provision of a jack actuating mechanism which will operate to depress the jack while maintaining it in substantially the same position laterally during the performance of the welt cutting operation, and thereafter to continue the movement of the jack outwardly to the usual inoperative rest position as shown in Fig. 1. To this end a locking mechanism has been provided for locking the arm 626 against movement about its pivot during a portion of the swinging movement of the trap door 630 to depress the bar 624 and disengage the jack and shoe mounted thereon from its operating devices. When the trap door 630 reaches substantially the position shown in Fig. 53, the locking mechanism is arranged to release the lever arm 626 and allow the arm and control bar 624 to be moved forwardly with the trap door 630 to the position shown in Fig. 54. The locking mechanism comprises a toothed segment 646 which is secured by means of screws 650 to the arm 626, and is arranged to engage with a locking pawl 652 pivotally mounted at 654 on the machine frame. During the normal operation of the machine the pawl 652 is permitted to slide over the teeth of the segment 646 to permit free movement of the arm 626 about its pivot. The pawl 652 is held in locking engagement with the segment 646 during a predetermined portion of the downward movement of the trap door 630 by means of connections which comprise a lever arm 656 pivoted on a rock shaft 658 and provided at its extremity with a cam-shaped member 660 which is arranged to pass over a roll 662 mounted in a bracket 664 on the pawl 652. There is also formed on the hub of the locking lever 656 a lever arm 666 which is connected by a forwardly extending link 668 to the lever 636 for controlling the operation of the trap door 630.

During the sewing operation, starting with the operating parts as shown in Fig. 52, the locking lever 656 will occupy substantially the position shown in Fig. 58, the cam 660 being disengaged from the roll 662, so that the pawl 652 is free to slide with relation to the toothed segment 646. When the stop motion is thrown into operation, the movement of the eccentric 644 causes the trap door 630 to swing into the dotted line position in Fig. 52. At the same time the locking lever 656 actuated through the connecting link 668 will be moved in a direction to bring the cam 660 into locking position over the roll 662 to lock the lever arm 626 against further movement about its pivot. The continued movement of the trap door to the position shown in Fig. 53, causes the jack to be depressed while being at the same time held against outward movement by the locking engagement of the pawl 652 and toothed segment 646. As the trap door 630 reaches the position shown in Fig. 53, it dwells while the welt cutting knife is actuated to sever the welt. At the completion of the dwell the locking lever 656 will have reached the position shown in Fig. 59 to again release the pawl 652, so that, as the movement of the trap door 630 is continued, the control bar 624 and jack can be moved outwardly to the normal stop position shown in Fig. 54. The locking lever 656 at this time will occupy the position shown in Fig. 60, being then returned to the position shown in Fig. 58 as the eccentric 644 completes its revolution and comes to rest in the usual manner.

Certain features of the machine herein disclosed but not claimed, relating particularly to the mechanisms for lasting and for lasting and sewing, form the subject-matter of a divisional application filed November 16, 1937, Serial No. 174,798.

Certain other features of the machine herein disclosed but not claimed, relating particularly to mechanisms for guiding and for moving the needle in the line of feed, for cutting the thread, and for automatically stopping the machine upon the breaking or mis-looping of the needle thread, form the subject matter of a divisional application filed November 16, 1937, Serial No. 174,799.

The nature and scope of the present invention having been indicated and a machine embodying the several features of the invention having been specifically described, what is claimed is:—

1. A welt sewing machine having, in combination, stitch forming devices, a reciprocatory welt slashing knife, means for guiding a welt controlled by the reciprocatory movement of the knife to bend the welt and bring the said bent portion into the path of the knife on the cutting stroke thereof, and mechanism for automatically starting and stopping the reciprocation of the knife to slash that portion of the welt only which registers with the toe of the shoe.

2. A machine for operating upon welts having, in combination, a reciprocatory knife for slashing a welt, a welt guiding member, a pivotal support therefor, and cam means actuated by the cutting stroke of the knife for moving said member about its pivot to move the welt into the path of the knife.

3. A machine for operating upon welts having, in combination, a reciprocatory knife for slashing a welt, a welt guiding member, and means rendered operative during each advancing movement of the knife for actuating said member to bend the welt into the path of the knife and thereafter, during the retracting movement of the knife, to retract the welt.

4. A machine for operating upon a welt having, in combination, means for guiding a welt, and a knife for slashing the welt arranged to reciprocate at an angle to the welt substantially in the direction of feed and having a cutting blade extending parallel to the grain side of the welt and projecting obliquely toward the outside edge.

5. A machine for operating upon a welt having, in combination, a reciprocating knife for slashing the welt, and means for guiding a welt arranged during each forward reciprocation of the knife to bend the welt to present a curved portion of the welt tangentially in the path of the advancing knife to secure a cut of predetermined depth into the welt.

6. A machine for operating upon a welt having, in combination, devices for securing a welt to the shoe, a reciprocating knife for slashing the welt, and means for guiding the welt arranged for each cutting stroke of the knife to advance the welt into the path of the knife to present a curved portion of the welt tangentially thereto to secure a cut of predetermined depth.

7. A machine for operating upon a welt having, in combination, a reciprocating knife for slashing the welt, and means for guiding a welt arranged to present a curved portion of the welt tangentially in the path of the knife at a predetermined distance from the under or grain side of the welt.

8. A machine for operating upon a shoe having, in combination, devices for securing a welt to a shoe, a reciprocating knife for slashing the welt, and means for guiding the welt arranged on each cutting stroke of the knife to advance the welt to present a curved portion thereof in the path of the knife.

9. A welt sewing machine having, in combination, stitch forming devices including a needle for sewing a welt to a shoe, a welt guide arranged to engage with the shoe adjacent the point of operation of the needle, a welt guide support movable toward and from the shoe, a welt cutting knife mounted on the welt guide support and movable thereon to sever the welt, and means rendered operative at the end of the welt sewing operation to operate the knife.

10. A welt sewing machine having, in combination, stitch forming devices including a needle, a welt guide arranged to engage with the shoe adjacent the point of operation of the needle, a welt cutting knife mounted to sever the welt in advance of and close to the sewing point, and power operated mechanism for actuating the knife to sever the welt after the completion of the sewing operation.

11. A welt sewing machine having, in combination, stitch forming devices including a needle, a welt guide arranged to engage with the shoe adjacent the point of operation of the needle, a welt cutting knife mounted to sever the welt in advance of and close to the sewing point, and power operated mechanism for actuating the knife to sever the welt and for advancing the severed end of the welt beyond the sewing point after the completion of the sewing operation.

12. A welt sewing machine having, in combination, stitch forming devices including a needle, a welt guide arranged to engage with the shoe adjacent the point of operation of the needle, a welt cutting knife mounted to sever the welt in advance of and close to the sewing point, and mechanism operating upon stopping the machine to actuate the knife to sever the welt.

13. A welt sewing machine having, in combination, stitch forming devices including a needle, a welt guide arranged to engage with the shoe adjacent the point of operation of the needle, a welt cutting knife mounted to sever the welt in advance of and close to the sewing point, and mechanism operating upon stopping the machine to actuate the knife to sever the welt and advance the severed end of the welt beyond the sewing point.

14. A welt sewing machine having, in combination, stitch forming devices including a needle, a welt guide arranged to engage with the shoe adjacent the sewing point, a welt guide support movable toward and from the shoe, a welt severing knife mounted to slide in the welt guide support to sever the welt adjacent the sewing point, stopping mechanism, means operated from the stopping mechanism for retracting the welt guide, and means for thereafter advancing the knife to sever the welt.

15. A welt sewing machine having, in combination, stitch forming devices including a needle, a welt guide arranged to engage with the shoe adjacent the sewing point, a welt guide support, a welt severing knife mounted on said support to co-act with the welt guide to sever the welt, stopping mechanism for the machine, means actuated by said stopping mechanism in stopping the machine to retract the welt guide, and means acting thereafter to actuate the knife to sever the welt.

16. A welt sewing machine having, in combination, stitch forming devices including a needle for sewing a welt to a shoe, a welt guide arranged to engage with the shoe adjacent the sewing point, a welt guide support movable toward and from the shoe, a welt severing knife mounted in the welt guide support, stopping mechanism for the machine, an auxiliary mechanism rendered operative upon stopping the machine, means operated from the stopping mechanism for retracting the welt guide, and means operated thereafter by said auxiliary mechanism to actuate the knife to sever the welt.

17. A welt sewing machine having, in combination, stitch forming devices including a needle, a welt guide arranged to engage with the shoe adjacent the point of operation of the needle, a welt cutting knife mounted to sever the welt in advance of and close to the sewing point, a welt feeding finger, mechanism for actuating the knife to sever the welt, and connections operated from the knife actuating mechanism for actuating the feed finger to advance the severed end of the welt beyond the sewing point.

18. A welt sewing machine having, in combination, stitch forming devices including a needle, a welt guide arranged to engage with the shoe adjacent the point of operation of the needle, a welt cutting knife mounted to sever the welt in advance of the sewing point, a welt feeding finger, mechanism for actuating the knife to sever the welt, and connections between the knife actuating mechanism and the finger acting during advancing movement of the knife to retract the finger and during the retracting movement of the knife to cause the finger to advance the severed end of the welt beyond the sewing point.

19. A welt sewing machine having, in combination, stitch forming devices including a needle, a welt guide arranged to engage with the shoe adjacent the point of operation of the needle, a welt cutting knife mounted to sever the welt in advance of and close to the sewing point, a welt feeding finger arranged to engage the welt near the point of severance, mechanism for actuating the knife to sever the welt, and means for actuating the feed finger to advance the severed end of the welt beyond the sewing point.

20. A welt sewing machine having, in combination, stitch forming devices including a needle, a welt guide arranged to engage with the shoe adjacent the point of operation of the needle, a welt cutting knife mounted to sever the welt in advance of and close to the sewing point, a welt feeding finger arranged to engage the welt at a point where it is supported by the welt guide, mechanism for actuating the knife to sever the welt, and means for actuating the feed finger to advance the severed end of the welt beyond the sewing point.

21. A welt sewing machine having, in combination, stitch forming devices including a needle, a welt guide arranged to engage with the shoe adjacent the sewing point, a welt guide support movable toward and from the shoe, a welt severing knife mounted in the welt guide support, and mechanism operating upon stopping the machine to retract the welt guide and thereafter actuate the knife to sever the welt.

22. A welt sewing machine having, in combination, stitch forming devices including a needle, a welt guide arranged to engage with the shoe adjacent the point of operation of the needle, a welt guide support movable toward and from the shoe, a welt cutting knife mounted in the welt guide support to sever the welt in advance of the sewing point, a feed finger on the welt guide support, and connections rendered operative by the advancing movement of the knife to retract the finger, and upon retracting the knife to cause the finger to engage with and advance the severed end of the welt beyond the sewing point.

23. A welt sewing machine having, in combination, stitch forming devices, a device for severing the welt, a shoe supporting jack, mechanism operating at the completion of the operation on the shoe to depress the jack, means for locking the jack in depressed position, and means for actuating said welt cutting device to sever the welt while the jack is depressed.

24. A welt sewing machine having, in combination, stitch forming devices, a device for severing the welt, a shoe supporting jack, mechanism operating at the completion of the operation on the shoe to depress the jack, means for locking the jack in depressed position, means for actuating said welt cutting device to sever the welt while the jack is depressed, and means rendered operatively thereafter for unlocking the jack and moving it outwardly.

25. A welt sewing machine having, in combination, stitch forming devices, a shoe supporting jack, a control bar for the jack, a pivoted frame arranged to swing into engagement with the bar to depress and move the jack forwardly out of operative position, connections for actuating said frame having a lost motion to provide a dwell in the movement of the frame between the operations of depressing and advancing the jack, a device for severing the welt rendered operative to cut the welt during said dwell, and means rendered operative in stopping the machine to lock the jack against forward movement for the duration of said dwell.

26. A welt sewing machine having, in combination, stitch forming devices, a shoe supporting jack, means for imparting feeding, tipping and turning movements to said jack to transfer the point of operation about the shoe, a control bar for said jack, a pivoted frame arranged to swing into engagement with the bar to depress and move the jack forwardly out of operative position, connections for actuating said frame having a lost motion to provide a dwell in the movement of the frame prior to advancing the jack to inoperative position, a device for locking the control bar against forward movement comprising a gear tooth segment and pawl, means controlled by said connections for maintaining said pawl and gear segment in locking engagement during said dwell, and a welt severing device rendered operative in stopping the machine to sever the welt prior to said advancing movement of the jack to inoperative position.

27. A welt sewing machine having, in combination, stitch forming devices, a shoe supporting jack, means for imparting feeding, tipping and turning movements to the jack to transfer the point of operation about the shoe, a control bar for the jack, a pivoted frame arranged to swing into engagement with the bar to depress and move the jack forwardly out of operative position, connections for actuating said frame having a lost motion to provide a dwell in the movement of the frame prior to advancing the jack out of operative position, a locking device controlled by said connections to lock the jack against forward movement prior to the termination of said dwell, and a welt severing device rendered operative in stopping the machine to sever the welt prior to the termination of said dwell.

ALFRED R. MORRILL.